(12) United States Patent
Kropp

(10) Patent No.: US 9,448,373 B2
(45) Date of Patent: Sep. 20, 2016

(54) OPTO-ELECTRONIC MICRO-MODULE AND METHOD FOR FORMING THE SAME

(71) Applicant: EZCONN CORPORATION, Taipei (TW)

(72) Inventor: Joerg-Reinhardt Kropp, Taipei (TW)

(73) Assignee: EZCONN CORPORATION, Taipei (TW)

( * ) Notice: Subject to any disclaimer, the term of this patent is extended or adjusted under 35 U.S.C. 154(b) by 0 days.

(21) Appl. No.: 14/608,211

(22) Filed: Jan. 29, 2015

(65) Prior Publication Data

US 2016/0004019 A1  Jan. 7, 2016

(30) Foreign Application Priority Data

Jul. 4, 2014  (TW) .............................. 103211901 A

(51) Int. Cl.
*G02B 6/32* (2006.01)
*G02B 6/42* (2006.01)

(52) U.S. Cl.
CPC ........... *G02B 6/4246* (2013.01); *G02B 6/4206* (2013.01); *G02B 6/4214* (2013.01); *G02B 6/4215* (2013.01)

(58) Field of Classification Search
None
See application file for complete search history.

(56) References Cited

U.S. PATENT DOCUMENTS

| | | | |
|---|---|---|---|
| 4,740,951 A | 4/1988 | Lizet et al. | |
| 5,299,570 A | 4/1994 | Hatschek | |
| 5,448,586 A | 9/1995 | Shmulovich et al. | |
| 5,696,862 A * | 12/1997 | Hauer | G02B 6/4214 385/14 |
| 5,940,568 A | 8/1999 | Losch | |
| 6,108,463 A | 8/2000 | Herron et al. | |
| 6,215,928 B1 | 4/2001 | Friesem et al. | |
| 6,271,945 B1 | 8/2001 | Terahara | |
| 6,321,001 B1 | 11/2001 | Heflinger | |
| 6,356,679 B1 | 3/2002 | Kapany | |
| 6,574,390 B2 | 6/2003 | Kropp | |
| 7,013,056 B2 * | 3/2006 | Lin | G02B 6/29362 385/14 |
| 8,300,993 B2 | 10/2012 | Moll et al. | |
| 8,331,751 B2 | 12/2012 | Delaney et al. | |
| 8,586,347 B2 | 11/2013 | Lochhead et al. | |
| 8,606,066 B2 | 12/2013 | Delaney et al. | |
| 8,992,100 B2 * | 3/2015 | Lim | G02B 6/4201 385/88 |
| 2004/0146304 A1 * | 7/2004 | Kuhara | G02B 6/4206 398/138 |
| 2007/0146881 A1 * | 6/2007 | Tanaka | G02B 6/4246 359/485.06 |
| 2009/0003833 A1 * | 1/2009 | Chung | H01S 5/02284 398/136 |

* cited by examiner

*Primary Examiner* — Sung Pak

(57) ABSTRACT

An opto-electronic micro-module includes a monocrystalline substrate having a first surface and a second surface parallel to said first surface, wherein a through hole passes from said first surface through said monocrystalline substrate to said second surface; and an optical substrate having a first portion in said through hole and a second portion protruding from said through hole.

20 Claims, 29 Drawing Sheets

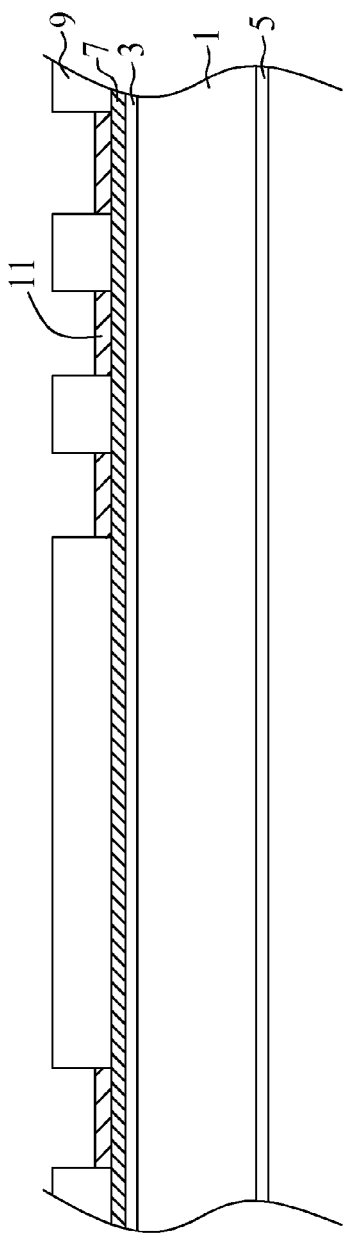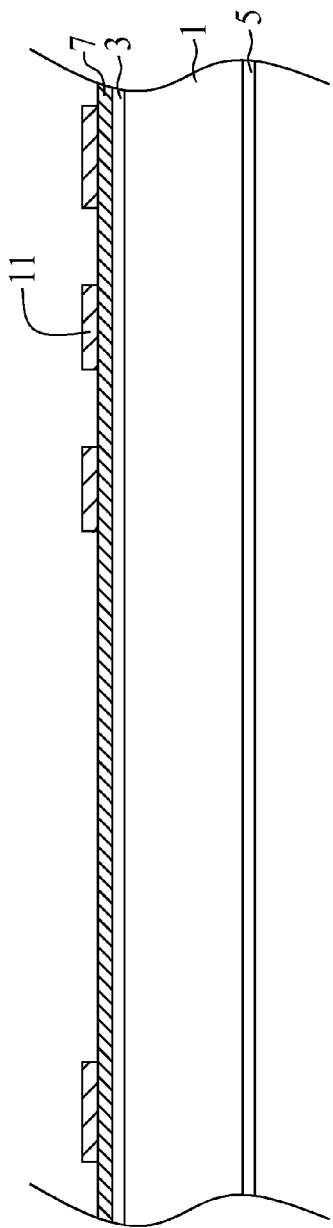
Fig.1g
Fig.1h

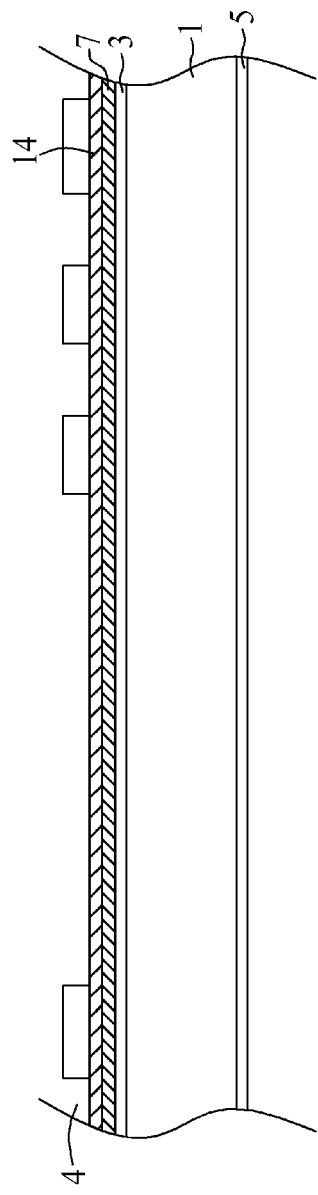
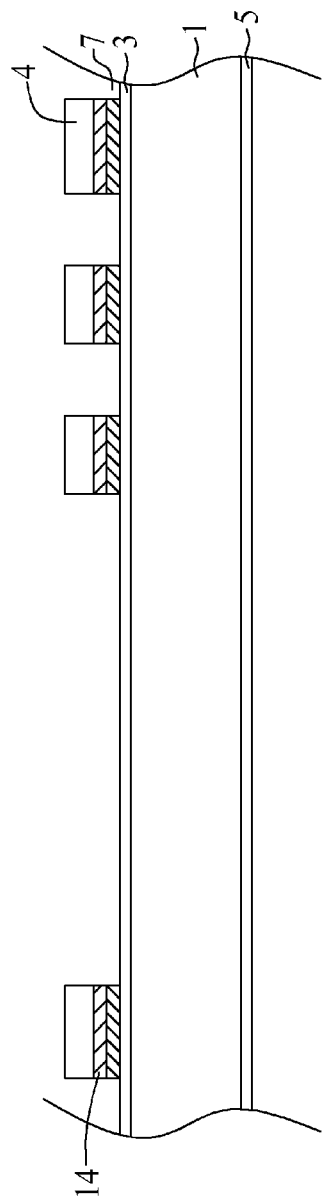

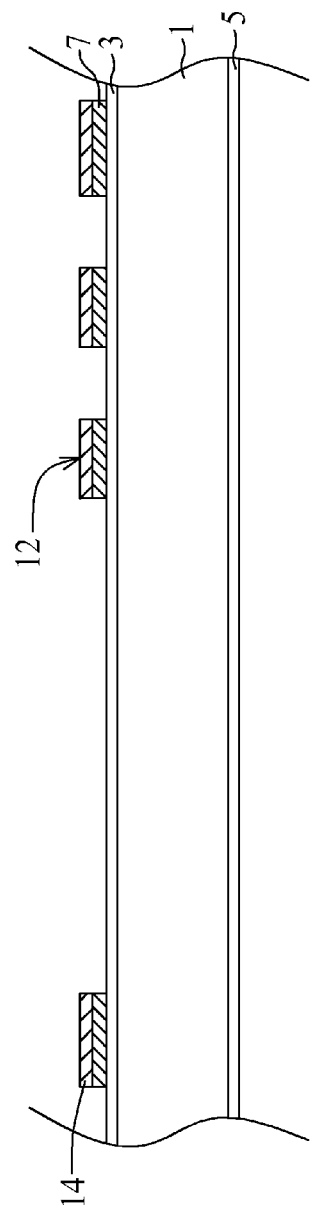
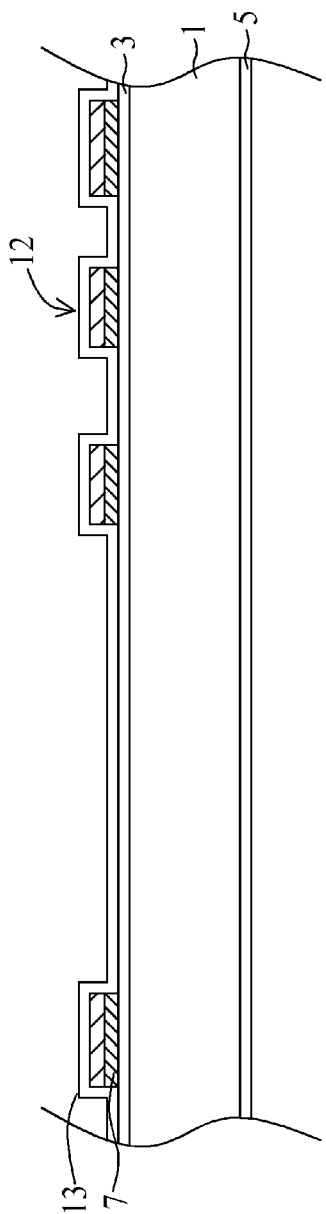
Fig.1n
Fig.1o

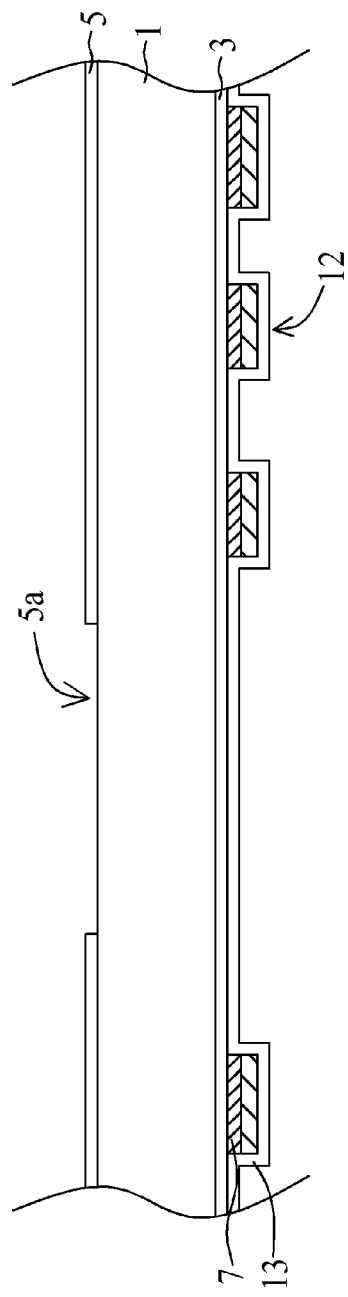
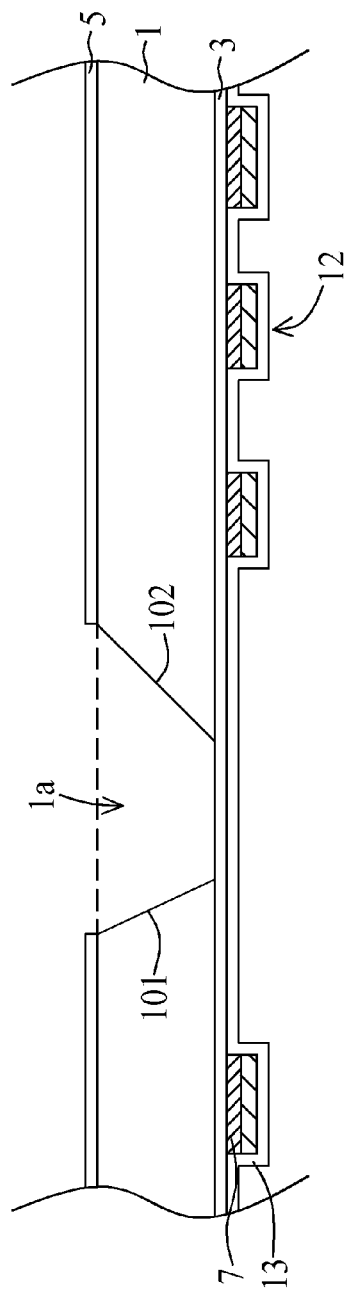
Fig. 1p
Fig. 1q

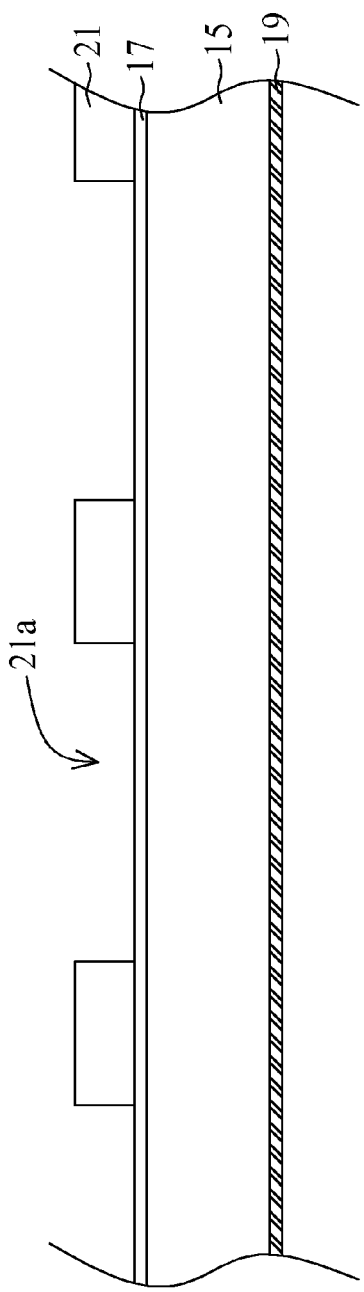
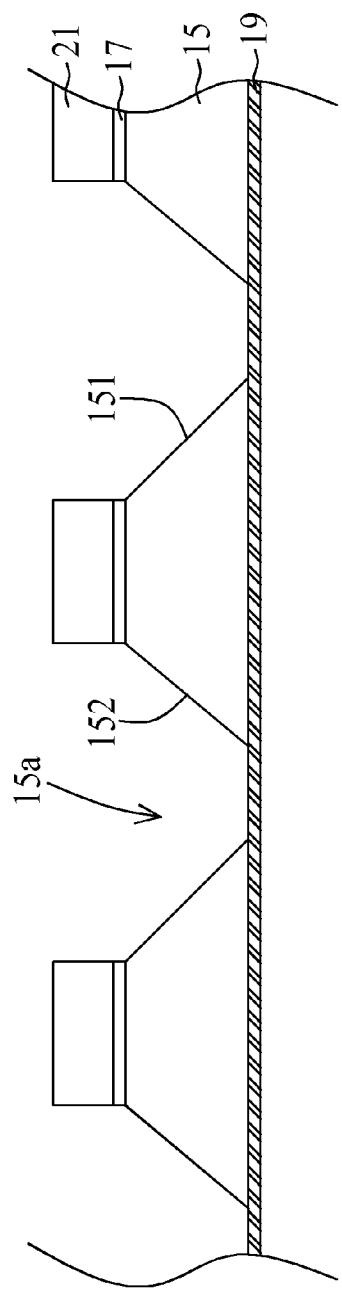
Fig. 2c
Fig. 2d

OPTO-ELECTRONIC MICRO-MODULE AND METHOD FOR FORMING THE SAME

This patent application claims priority of Taiwan Patent Application No. 103211901, filed on Jul. 4, 2014, the entirety of which is incorporated herein by reference.

FIELD OF THE DISCLOSURE

The present disclosure relates to an opto-electronic micro-module and method for forming the same, and more particularly to an opto-electronic micro-module formed using a semiconductor-wafer-level process.

BRIEF DESCRIPTION OF THE RELATED ART

In a current communication system, at least two optical fibers are employed to transmit optical signals with the same wavelength in two ways. With the increase in transmission distance and the rapid rise in the number of users and in demand, in consideration of the cost for setting up a fiber-optic network, a communication technology of wave division multiplexing (WDM) is provided to achieve the purpose of full duplexing. The communication technology employs an optical fiber to uplink and downlink two optical signals with different wavelengths. For example, a common optical fiber may be used to transmit an optical signal in a wavelength of 1310 nm and receive an optical signal in a wavelength of 1550 nm, and a WDM filter may be set at each of transmit (TX) and receive (RX) terminals to separate the optical signals in different wavelengths. Thereby, transmission in two ways may be achieved.

Even though the setup for a fiber-optic network may have reduced cost, an individual transmitter outline can (TO-can) package may be employed at each of the transmit (TX) and receive (RX) terminals of a bidirectional optical subassembly for bidirectional transmission. The transmitter outline can (TO-can) package includes a metal body for receiving a WDM filter and a coupled optical fiber and thereby has the following disadvantages of large volume, complexity of assembly alignment, low efficiency of optical coupling and large number of parts. In order to solve the above disadvantages, an opto-electronic micro-module is provided with its parts efficiently assembled so as to have reduced volume and have a low cost.

SUMMARY OF THE DISCLOSURE

The present disclosure provides an opto-electronic micro-module that may be fabricated using a semiconductor-wafer-level process. Thereby, the opto-electronic micro-module may have reduced volume and low fabrication cost. Also, the opto-electronic micro-module may have a relatively wide range of operation temperature and improved stability of signal transmission.

The present disclosure provides an opto-electronic micro-module configured to couple with an optical fiber. The opto-electronic micro-module includes a monocrystalline substrate having a first surface and a second surface parallel to said first surface, wherein a through hole passes from said first surface through said monocrystalline substrate to said second surface; and an optical substrate having a first portion in said through hole and a second portion protruding from said through hole.

The present disclosure provides an opto-electronic micro-module configured to couple with an optical fiber. The opto-electronic micro-module includes a silicon substrate having a first surface and a second surface parallel with the first surface, wherein a through hole passes from the first surface through the silicon substrate to the second surface; and an optical substrate, such as optical splitter, having a first portion in the through hole and a second portion protruding from the through hole, wherein the optical substrate is configured to optically couple with the optical fiber.

The present disclosure provides an opto-electronic micro-module including a substrate having a first surface and a second surface parallel with the first surface, wherein a through hole passes from the first surface through the substrate to the second surface, wherein the through hole has sidewall with an planar surface inclined to the first surface with an acute angle; and an optical substrate, such as optical splitter, having a first portion in the through hole and a second portion protruding from the through hole, wherein the optical substrate has a third surface arranged in parallel with the planar surface.

The present disclosure provides a method for forming an opto-electronic micro-module, including providing a silicon substrate, wherein a through hole passes through the silicon substrate; and arranging an optical substrate, such as optical filter, having a first portion in the through hole and a second portion protruding from the through hole.

These, as well as other components, steps, features, benefits, and advantages of the present disclosure, will now become clear from a review of the following detailed description of illustrative embodiments, the accompanying drawings, and the claims.

BRIEF DESCRIPTION OF THE DRAWINGS

The drawings disclose illustrative embodiments of the present disclosure. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same reference number or reference indicator appears in different drawings, it may refer to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings:

FIGS. 2a-2e are cross-sectional views illustrating a process for forming an optical substrate, such as optical splitter, in accordance with the first embodiment of the present invention;

Figure 1A:
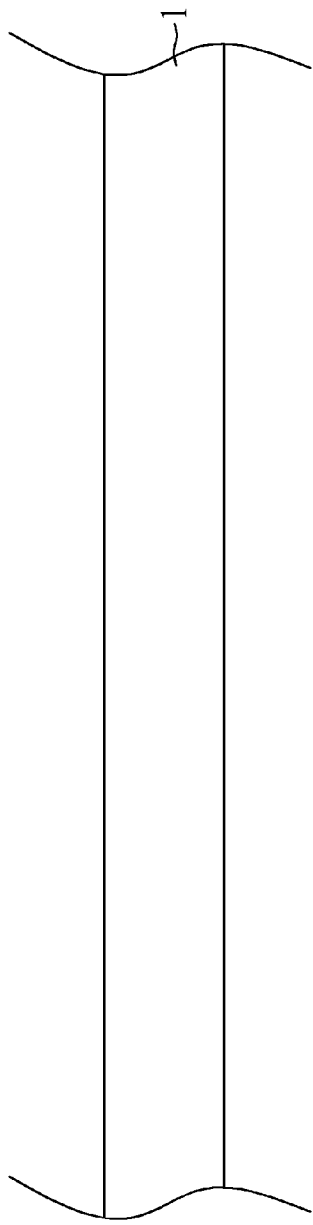
FIGS. 1a-1s are cross-sectional views illustrating a process for forming a substrate in accordance with a first embodiment of the present invention.

While certain embodiments are depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION OF THE INVENTION

Illustrative embodiments are now described. Other embodiments may be used in addition or instead. Details that may be apparent or unnecessary may be omitted to save space or for a more effective presentation. Conversely, some embodiments may be practiced without all of the details that are disclosed. When the same reference number or reference indicator appears in different drawings, it may refer to the same or like components or steps.

The present disclosure provides an opto-electronic micro-module configured to transmit optical signals. For example, the opto-electronic micro-module may be applied to optical-signal transmission between an bi-directional signal transmission module, such as bi-directional (BiDi) small form-factor pluggable (SFP) transceiver, bi-directional (BiDi) 10 Gigabit small form-factor pluggable (XFP) transceiver, bi-directional (BiDi) gigabit interface converter (GBIC), or fiber-to-the-home (FTTH) optical line terminal (OLT), and an optical network unit (ONU).

First Embodiment

Figure 1B:
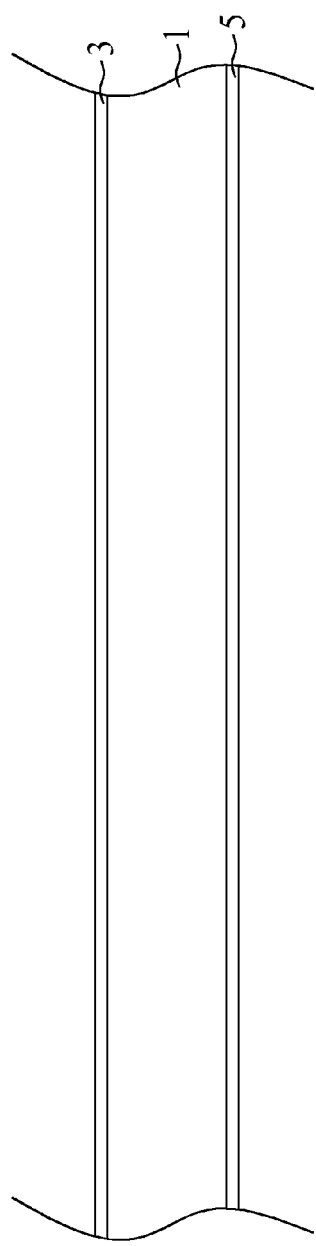
Figure 1C:
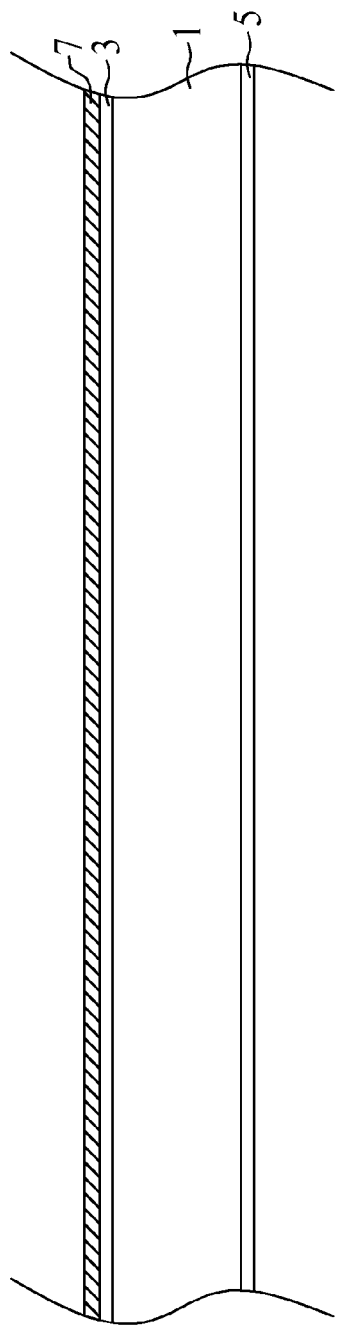
Figure 1D:
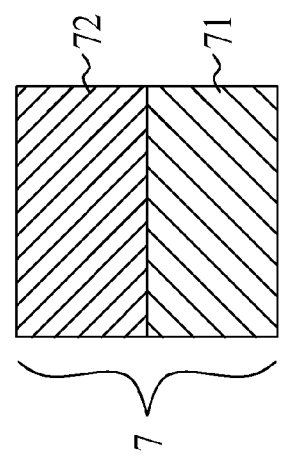
Figure 1E:
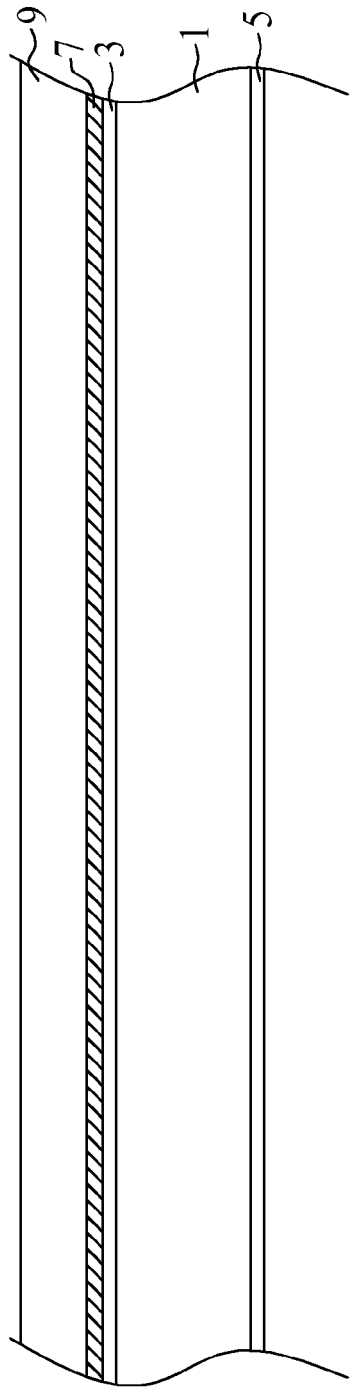
Figure 1F:
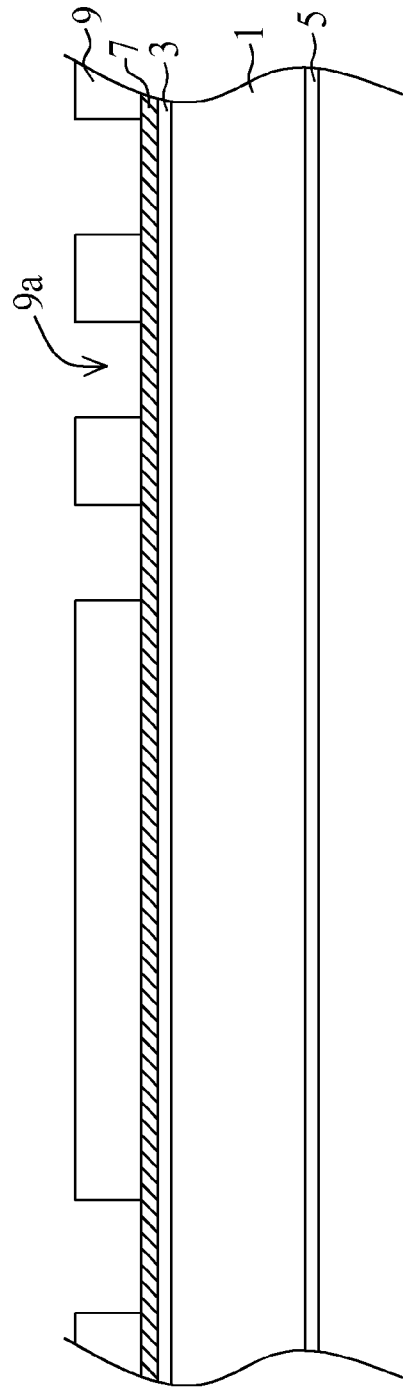
Figure 1I:
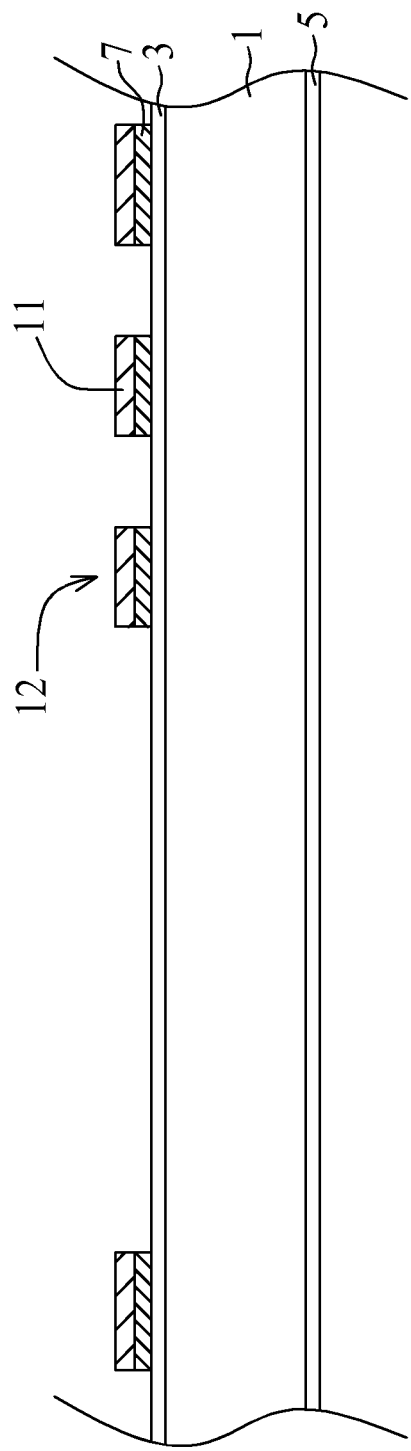
Figure 1J:
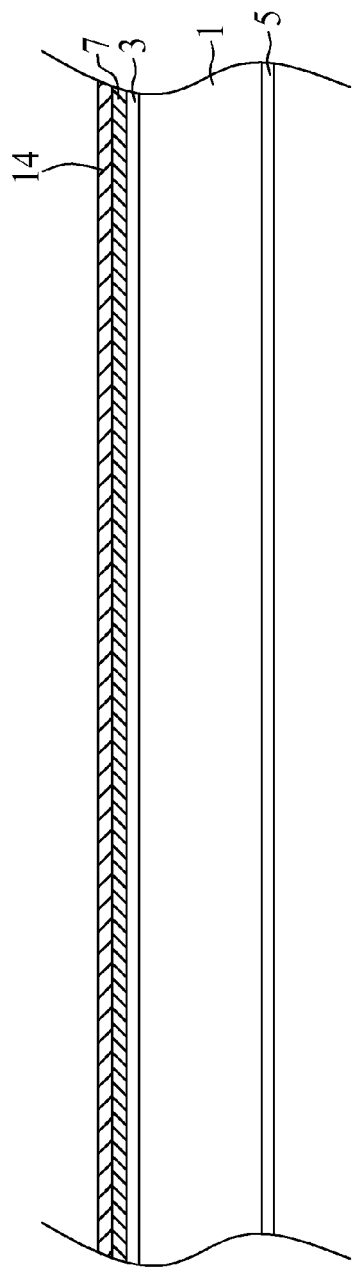
Figure 1K:
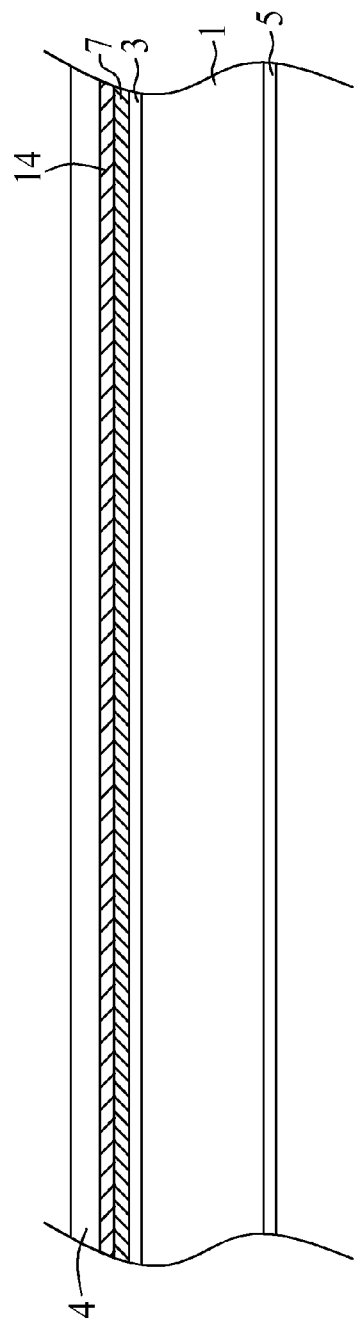
Figure 1R:
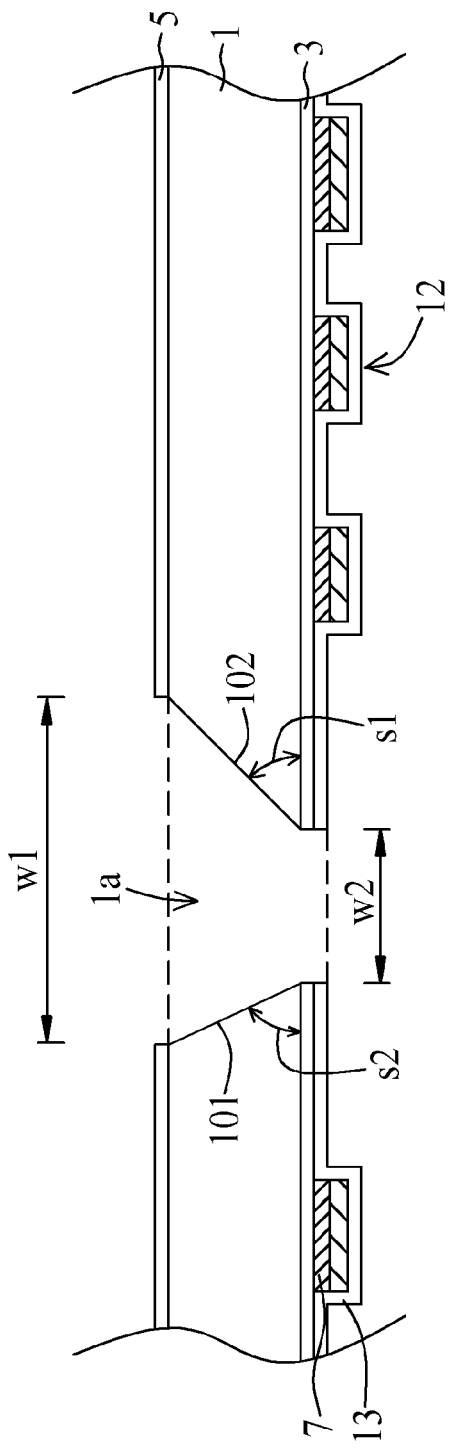
Figure 1S:
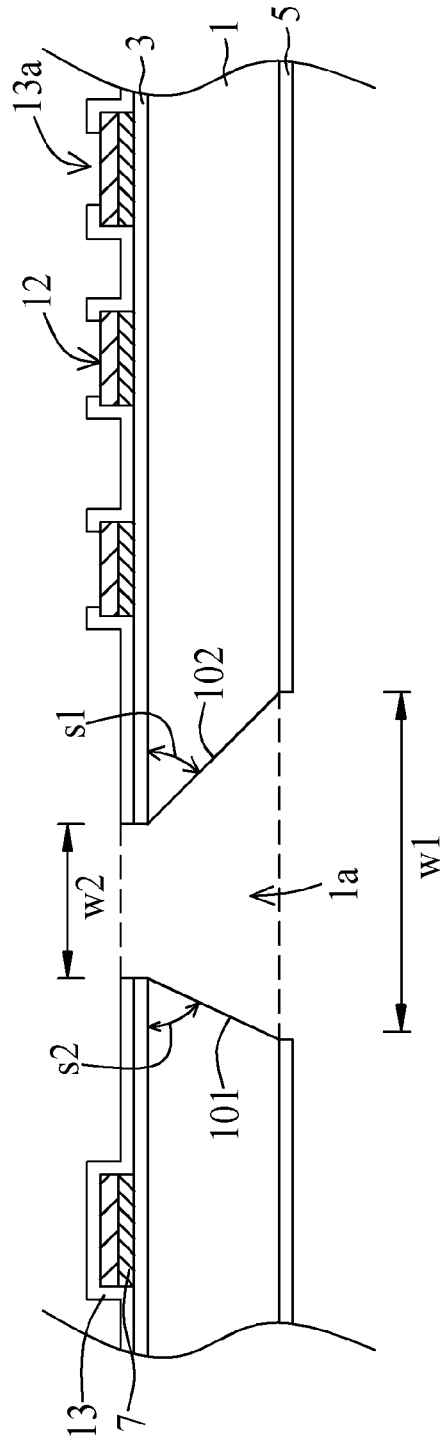
Figure 2A:
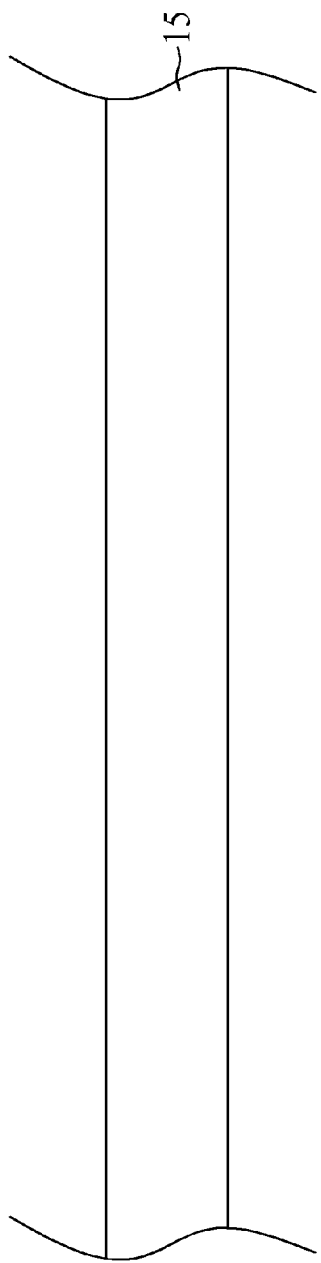

FIGS. 1a-1s are cross-sectional views illustrating a process for forming a substrate in accordance with a first embodiment of the present invention. FIGS. 2a-2e are cross-sectional views illustrating a process for forming an optical substrate, such as optical splitter, in accordance with the first embodiment of the present invention. FIG. 2f is a perspective view of the optical substrate, such as optical splitter, shown in FIG. 2e in accordance with the first embodiment of the present invention. FIGS. 3a-3h are cross-sectional views illustrating a process for assembling the optical substrate, such as optical splitter, and the substrate in accordance with the first embodiment of the present invention. FIGS. 4a-4d are cross-sectional views illustrating a process for assembling an opto-electronic micro-module in accordance with the first embodiment of the present invention. FIG. 5 is a cross-sectional view illustrating optical-signal transmission of an opto-electronic micro-module in accordance with the first embodiment of the present invention.

Referring to FIG. 1a, a substrate 1 is provided, wherein the substrate 1 may be a monocrystalline substrate or wafer, such as monocrystalline silicon wafer or monocrystalline germanium wafer, having a thickness between 150 and 6000 micrometers, such as between 150 and 600 micrometers, between 500 and 1,200 micrometers, between 1,000 and 3,000 micrometers or between 2,000 and 6,000 micrometers.

Referring to FIG. 1b, a dielectric or insulating layer 3 is formed on a top surface of the substrate 1, wherein the dielectric or insulating layer 3 may be a layer of silicon oxide, silicon nitride or a polymer, such as polyimide, epoxy resin, benzocyclobutene (BCB), polybenzoxazole (PBO), polyphenylene oxide (PPO), siloxane or SU-8 that is an epoxy-based negative photoresist, having a thickness between 0.5 and 30 micrometers, such as between 0.5 and 2 micrometers, between 1 and 3 micrometers, between 3 and 10 micrometers or between 5 and 30 micrometers. An etching stop layer 5 is formed on a bottom surface of the substrate 1, wherein the etching stop layer 5 may be a dielectric or insulating layer that may be a layer of silicon oxide, silicon nitride or a polymer, such as polyimide, epoxy resin, benzocyclobutene (BCB), polybenzoxazole (PBO), polyphenylene oxide (PPO), siloxane or SU-8, having a thickness between 0.5 and 30 micrometers, such as between 0.5 and 2 micrometers, between 1 and 3 micrometers, between 3 and 10 micrometers or between 5 and 30 micrometers. Alternatively, the etching stop layer 5 may be a metal layer, such as a layer of copper, aluminum, nickel, gold, nickel, chromium, titanium, titanium nitride, tantalum, tantalum nitride, a titanium-tungsten alloy or a nickel-vanadium alloy, having a thickness between 0.5 and 30 micrometers, such as between 0.5 and 2 micrometers, between 1 and 3 micrometers, between 3 and 10 micrometers or between 5 and 30 micrometers.

Next, a patterned circuit layer 12 is formed on the substrate using an electroplating process, sputtering process or electroless plating process. FIGS. 1c-1i are cross-sectional views illustrating the patterned circuit layer 12 formed in accordance with first steps of the present invention. FIGS. 1j-1n are cross-sectional views illustrating the patterned circuit layer 12 formed in accordance with second steps.

First steps of forming the patterned circuit layer 12 are illustrated in the following paragraphs. Referring to FIGS. 1c and 1d, the steps of forming a first metal layer 7 on the dielectric or insulating layer 3 includes sputtering an adhesion/barrier layer 71, such as a layer of titanium, tantalum, chromium, nickel, titanium nitride, tantalum nitride, a titanium-tungsten alloy or a nickel-vanadium alloy, having a thickness between 0.1 and 1.5 micrometers, such as between 0.1 and 0.5 micrometers, between 0.3 and 1 micrometers or between 0.8 and 1.5 micrometers, on the dielectric or insulating layer 3 and then sputtering a seed layer 72, such as a layer of copper, nickel, gold or a titanium-copper alloy, having a thickness between 0.1 and 2 micrometers, such as between 0.1 and 0.5 micrometers, between 0.3 and 1 micrometers or between 0.8 and 2 micrometers, on the adhesion/barrier layer 71.

Referring to FIG. 1e, a photoresist layer 9, such as a layer of positive photoresist or negative photoresist, is next formed on the first metal layer 7 by spin-coating or laminating.

Referring to FIG. 1f, the photoresist layer 9 is next patterned by a photolithography process including steps of exposing and developing such that multiple openings 9a are formed in the photoresist layer 9 and exposes the first metal layer 7.

Referring to FIG. 1g, an electroplating or electroless plating process may be employed to form a second metal layer 11, which is a conductive layer, on the first metal layer 7 at bottoms of the openings 9a such that the second metal layer 11 may be formed in the openings 9a. The second metal layer 11 may be a layer of copper, silver, gold, palladium, platinum, rhodium, ruthenium, rhenium or nickel, having a thickness greater than 1 micrometer, such as between 2 and 30 micrometers and preferably between 3 and 10 micrometers. Alternatively, the second metal layer 11 may be a composite layer provided with a stack of layers of metals selected from copper, silver, gold, palladium, platinum, rhodium, ruthenium, rhenium and nickel and with a thickness greater than 1 micrometer, such as between 2 and 30 micrometers and preferably between 3 and 10 micrometers. For example, the second metal layer 11 may be formed by first electroplating a nickel layer with a suitable thickness greater than 1 micrometer, such as between 2 and 30 micrometers and preferably between 3 and 10 micrometers, in the openings 9a and on the seed layer 72, such as a layer of copper, nickel or a titanium-copper alloy, of the first metal layer 7 at the bottoms of the openings 9a and then electroplating or electroless plating a gold or palladium layer, with a suitable thickness between 0.005 and 10 micrometers and preferably between 0.05 and 1 micrometers, in the openings 9a and on the electroplated nickel layer in the openings 9a.

Referring to FIG. 1h, the photoresist layer 9 is next removed. Next, referring to FIG. 1i, the first metal layer 7 not under the second metal layer 11 may be removed using a chemically wet-etching process or a reactive-ion etching (RIE) process, wherein the second metal layer 11 acts as a mask layer to prevent the first metal layer 7 under the second metal layer 11 from being removed. Thereby, the first and second metal layers 7 and 11 formed on the dielectric or insulating layer 3 may form the patterned circuit layer 12.

Second steps of forming the patterned circuit layer 12 are illustrated in the following paragraphs. Referring to FIG. 1j, after the first metal layer 7 is formed as mentioned above, an sputtering, electroplating or electroless plating process may be employed to form a third metal layer 14, such as a layer of copper, silver, gold, palladium, platinum, rhodium, ruthenium, rhenium or nickel, having a thickness between 1 micrometer and 5 micrometers, such as between 1 and 2 micrometers or between 2 and 5 micrometers.

Referring to FIG. 1k, a photoresist layer 4, such as a layer of positive photoresist or negative photoresist, is next formed on the third metal layer 14 by spin-coating or laminating.

Referring to FIG. 1l, the photoresist layer 4 is next patterned by a photolithography process including steps of exposing and developing such that multiple openings 4a are formed in the photoresist layer 4 and exposes the third metal layer 14.

Next, referring to FIG. 1m, the first and third metal layers 7 and 14 not under the photoresist layer 4 may be removed using a chemically wet-etching process or a reactive-ion etching (RIE) process, wherein the photoresist layer 4 acts as a mask layer to prevent the first and third metal layers 7 and 14 under the photoresist layer 4 from being removed.

Referring to FIG. 1n, the photoresist layer 4 is next removed. Thereby, the first and third metal layers 7 and 14 formed on the dielectric or insulating layer 3 may form the patterned circuit layer 12.

After the patterned circuit layer 12 is formed as shown in FIG. 1n or 1i, a dielectric or insulating layer 13 may be formed on the patterned circuit layer 12 and the dielectric or insulating layer 3, as shown in FIG. 1o. The dielectric or insulating layer 13 may have the same material as the dielectric or insulating layer 3 and may have a thickness between 0.5 and 30 micrometers, such as between 0.5 and 2 micrometers, between 1 and 3 micrometers, between 3 and 10 micrometers or between 5 and 30 micrometers.

Referring to FIG. 1p, multiple openings 5a (only one is shown) are formed in etching stop layer 5 at the bottom side of the substrate 1.

Referring to FIG. 1q, multiple holes 1a each having inclined sidewalls 101 and 102 and exposing the dielectric or insulating layer 3 are formed in the substrate 1 using an anisotropic wet-etching process, wherein an alkali solution or organic solution, such as potassium hydroxide, tetramethy ammonium hydroxide (TMAH) or ethylenedamine pyrocatochol (EDP), is employed to etch the substrate 1 until the holes 1a are formed to expose the dielectric or insulating layer 3.

Referring to FIG. 1r, the dielectric or insulating layer 3 at closed ends of the holes 1a is removed using an reactive ion-etching (RIE) process such that the holes 1a may become multiple through holes passing through the substrate 1. Each of the through holes 1a has a relatively great width w1 between 0.05 and 20 mm, such as between 0.05 and 1 mm, between 0.1 and 3 mm or between 3 and 20 mm, at the bottom side of the substrate 1 and a relatively small width w2 between 0.05 and 20 mm, such as between 0.05 and 1 mm, between 0.1 and 3 mm or between 3 and 20 mm, at the top side of the substrate 1, wherein the width w1 is greater than the width w2 by between 1.5 and 5 times, such as between 1.5 and 2 times or between 2 and 5 times. Each of the through holes 1a include the sidewall 102 inclined to the top surface of the substrate 1 by an acute angle s1 between 25 and 70 degrees, such as between 30 and 60 degrees, between 25 and 50 degrees, between 40 and 70 degrees or between 40 and 50 degrees, and the sidewall 101 inclined to the top surface of the substrate 1 by an acute angle s2 between 25 and 70 degrees, such as between 30 and 60 degrees, between 25 and 50 degrees or between 40 and 70 degrees, and preferably between 50 and 60 degrees.

Referring to FIG. 1s, multiple openings 13a are formed in the dielectric layer 13 to expose the patterned circuit layer 12.

The process for forming the optical substrate, such as optical splitter, is illustrated in the following paragraphs. Referring to FIG. 2a, a substrate 15 is provided, wherein the substrate 15 is transparent over an operating wavelength range. The substrate 15 may be a monocrystalline substrate, such as monocrystalline silicon substrate or monocrystalline germanium substrate, or glass substrate.

Figure 2B:
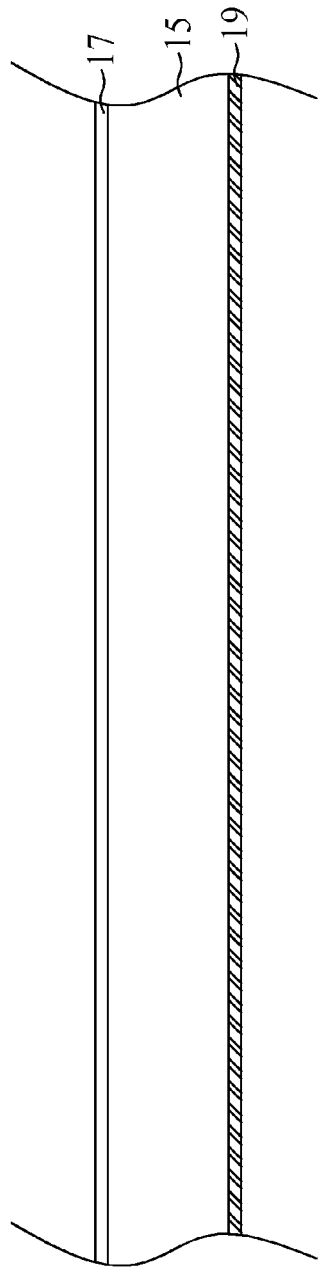

Referring to FIG. 2b, an optically anti-reflective layer 17 is formed on a top surface of the substrate 15 using an evaporation process, sputtering process, electroplating process or electroless-plating process. The optically anti-reflective layer 17 may be composed of three to thirty thin films, such as three to ten thin films or ten to thirty thin films, that may include a film of zinc oxide, aluminum-doped zinc oxide (AZO), gallium-doped zinc oxide (GZO), indium tin oxide (ITO), tin oxide, antimony-doped tin oxide (ATO), phosphorus-doped tin oxide (PTO), fluorine-doped tin oxide or polymer, or a combination of the above-mentioned films. The optically anti-reflective layer 17 may have a thickness between 500 Angstroms and 2 micrometers, such as between 500 Angstroms and 0.5 micrometers, between 0.1 and 1 micrometer or between 0.5 and 2 micrometers. An optically reflective layer 19 parallel to the optically anti-reflective layer 17 is formed on a bottom surface of the substrate 15 using an evaporation process, sputtering process, electroplating process or electroless-plating process. The optically reflective layer 19 may have functions of reflecting and filtering optical signals. The optically reflective layer 19 may be composed of three to thirty thin films, such as three to ten thin films or ten to thirty thin films, that may include a film of silicon oxide, titanium oxide, titanium, tantalum oxide, niobium oxide, magnesium fluoride, chromium or chromium oxide, or a combination of the above-mentioned films. The optically reflective layer 19 may have a thickness between 500 Angstroms and 2 micrometers, such as between 500 Angstroms and 0.5 micrometers, between 0.1 and 1 micrometer or between 0.5 and 2 micrometers.

Referring to FIG. 2c, a photoresist layer 21, such as a layer of positive photoresist or negative photoresist, is next formed on the optically anti-reflective layer 17 by spin-coating or laminating. The photoresist layer 21 is next patterned by a photolithography process including steps of exposing and developing such that multiple openings 21a are formed in the photoresist layer 21 and exposes the optically anti-reflective layer 17.

Referring to FIG. 2d, a holes 15a having inclined sidewalls 151 and 152 and exposing the optically reflective layer 19 are formed in the substrate 15 using an anisotropic wet-etching process, wherein an alkali solution or organic solution, such as potassium hydroxide, tetramethy ammonium hydroxide (TMAH) or ethylenedamine pyrocatochol (EDP), is employed to etch the substrate 15 until the holes 15a are formed to expose the optically reflective layer 19. The substrate 15 may be divided into multiple units separated from one another by the hole 15a.

Figure 2E:
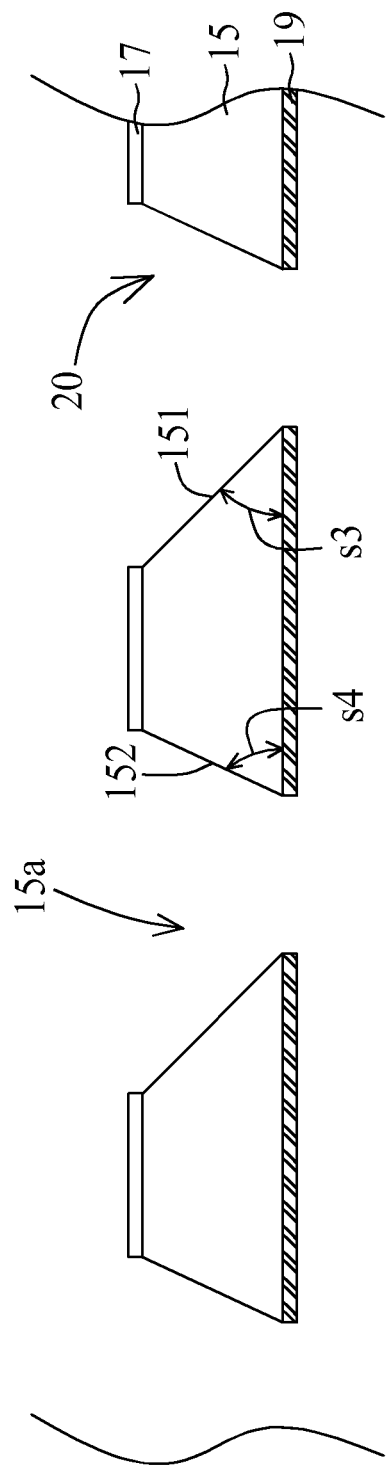
Figure 2F:
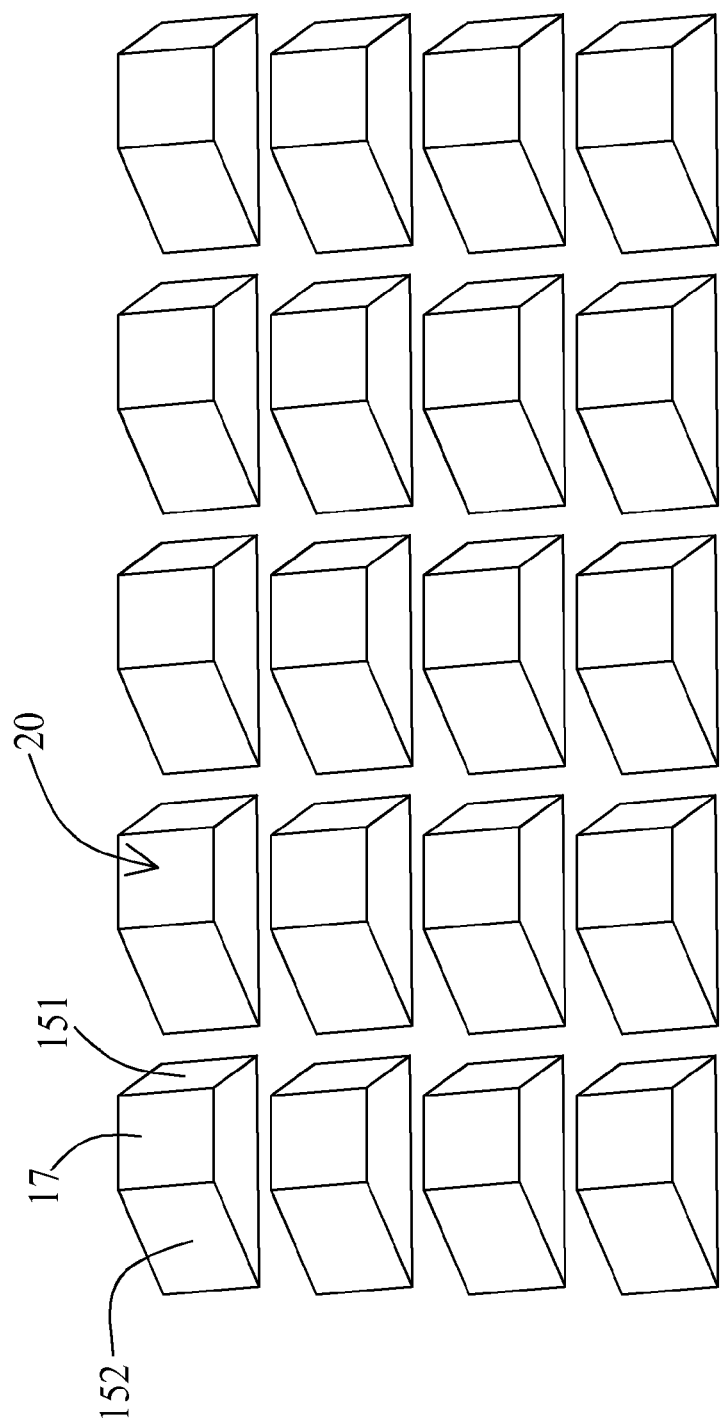
FIG. 2f is a perspective view of the optical substrate, such as optical splitter, shown in FIG. 2e in accordance with the first embodiment of the present invention.

Referring to FIGS. 2e and 2f, the optically reflective layer 19 at a closed end of the hole 15a is removed using an reactive ion-etching (RIE) process such that the hole 15a may pass through the substrate 15 to form multiple separate optical substrate 20 each having the inclined sidewalls 151 and 152 at opposite sides thereof. Each of the optical substrate 20 include the sidewall 151 inclined to the bottom surface of its substrate 15 by an angle s3 between 25 and 90 degrees, such as between 30 and 60 degrees, between 25 and 50 degrees, between 40 and 70 degrees or between 50 and 90 degrees, and preferably approximately at 45 degrees and the sidewall 152 inclined to the bottom surface of its substrate 15 by an angle s4 between 25 and 90 degrees, such as between 30 and 60 degrees, between 25 and 50 degrees, between 40 and 70 degrees or between 50 and 90 degrees, and preferably between 50 and 60 degrees. In this embodiment, the optical substrate 20 has a shape of trapezoid. Alternatively, the optical substrate 20 may have a shape of rectangular, ellipse, triangle square or polygon.

In this embodiment, the optical substrate 20 is an optical splitter having functions of reflecting and filtering optical signals. Alternatively, the optical substrate 20 may be an optical reflector having functions of reflecting optical signals but having no function of filtering optical signals. Alternatively, the optical substrate 20 may be an optical filter having functions of filtering optical signals but having no function of reflecting optical signals.

Figure 3A:
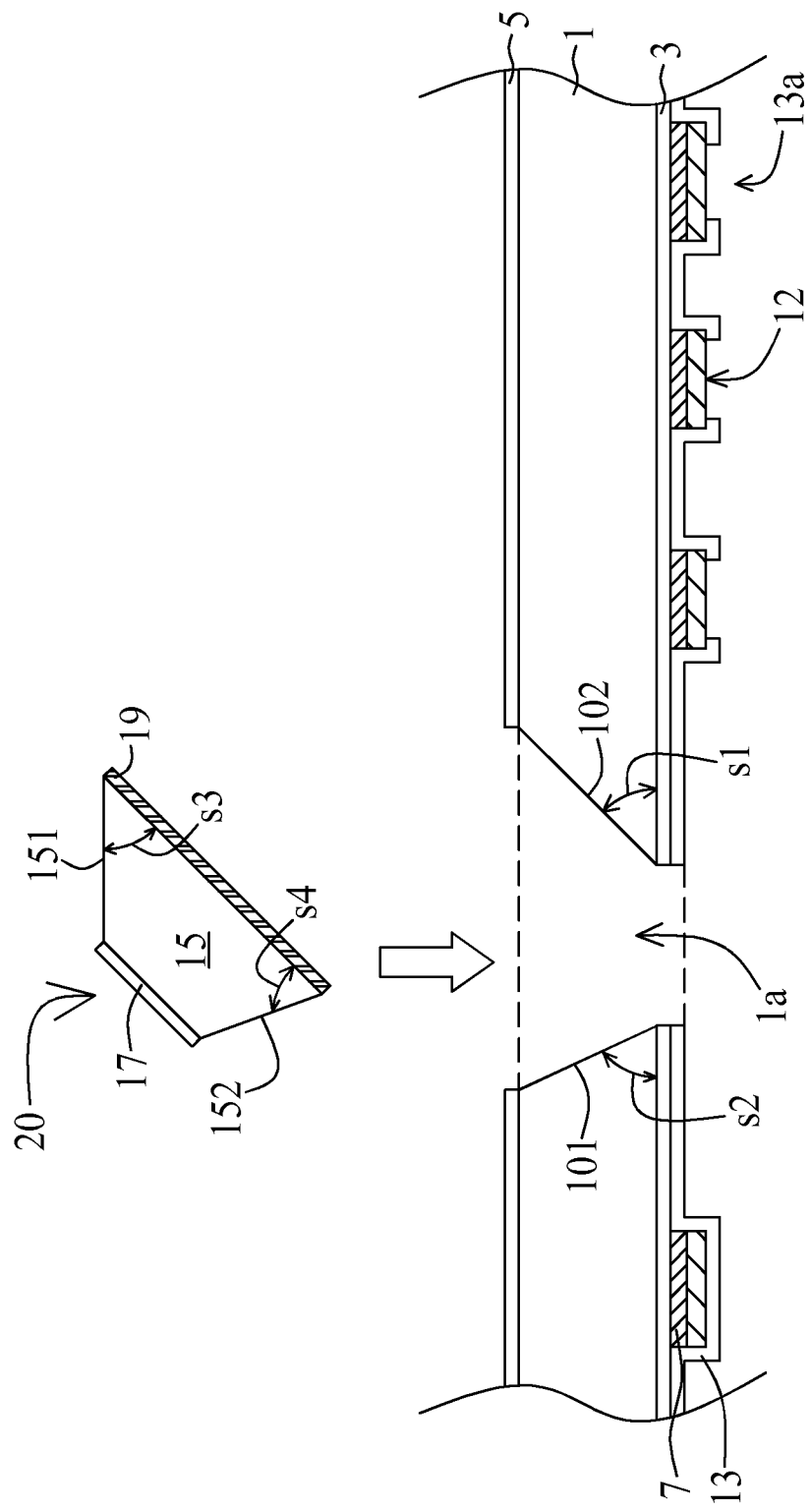
FIGS. 3a-3h are cross-sectional views illustrating a process for assembling the optical substrate, such as optical splitter, and the substrate in accordance with the first embodiment of the present invention.
Figure 3B:
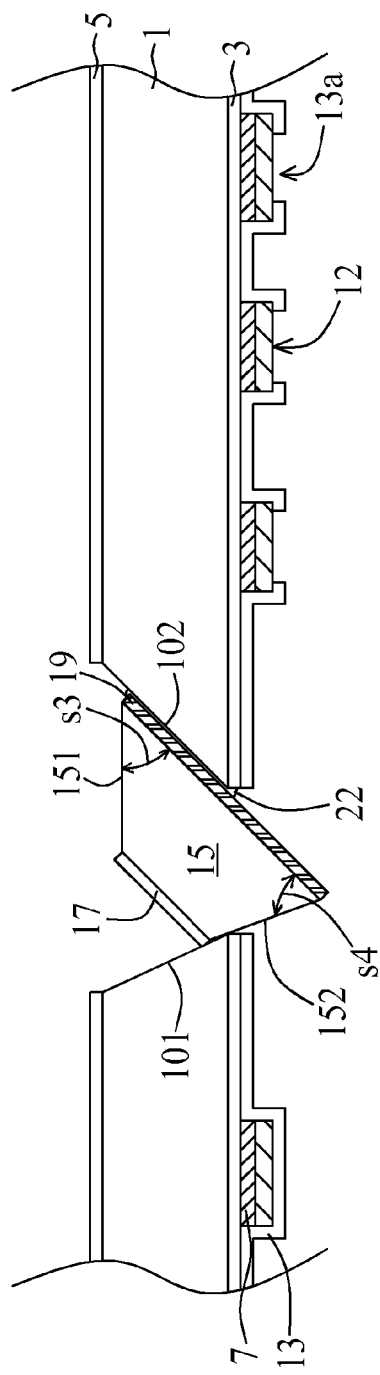
Figure 3C:
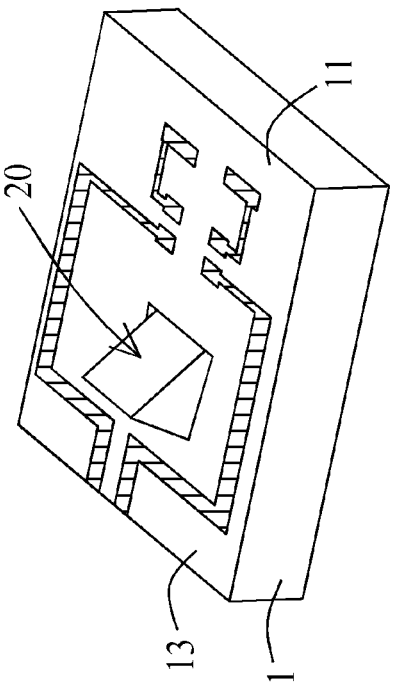

Referring to FIGS. 3a-3c, the optical substrate 20 is inserted into the through hole 1a in the substrate 1 from the bottom side of the substrate 1 and has the optically reflective layer 19 to slide along the inclined sidewall 102 of the through hole 1a until the through hole 1a has the sidewall 101 abutting against the optical substrate 20 such that the optical substrate 20 has a corner between its sidewall 152 and its bottom surface to protrude from the through hole 1a and from the top side of the substrate 1 with the optically reflective layer having a portion, close to the corner, protruding from the through hole 1a and from the top side of the substrate 1. An adhesive is provided between the optically reflective layer 19 of the optical substrate 20 and the inclined sidewall 102 of the through hole 1a so as to fix the optical substrate 20 to the substrate 1, wherein the optical substrate 20 has the top and bottom surfaces, at which the optically anti-reflective layer 17 and optically reflective layer 19 are formed respectively, substantially parallel to the sidewall 102 of the through hole 1a. The bottom surface of the optical substrate 20 faces the sidewall 102 of the through hole 1a. In the case that the angle s3 may be substantially the same as the angle s1, the sidewall 151 of the optical substrate 20 may be substantially parallel to the top surface of the substrate 1.

Figure 3D:
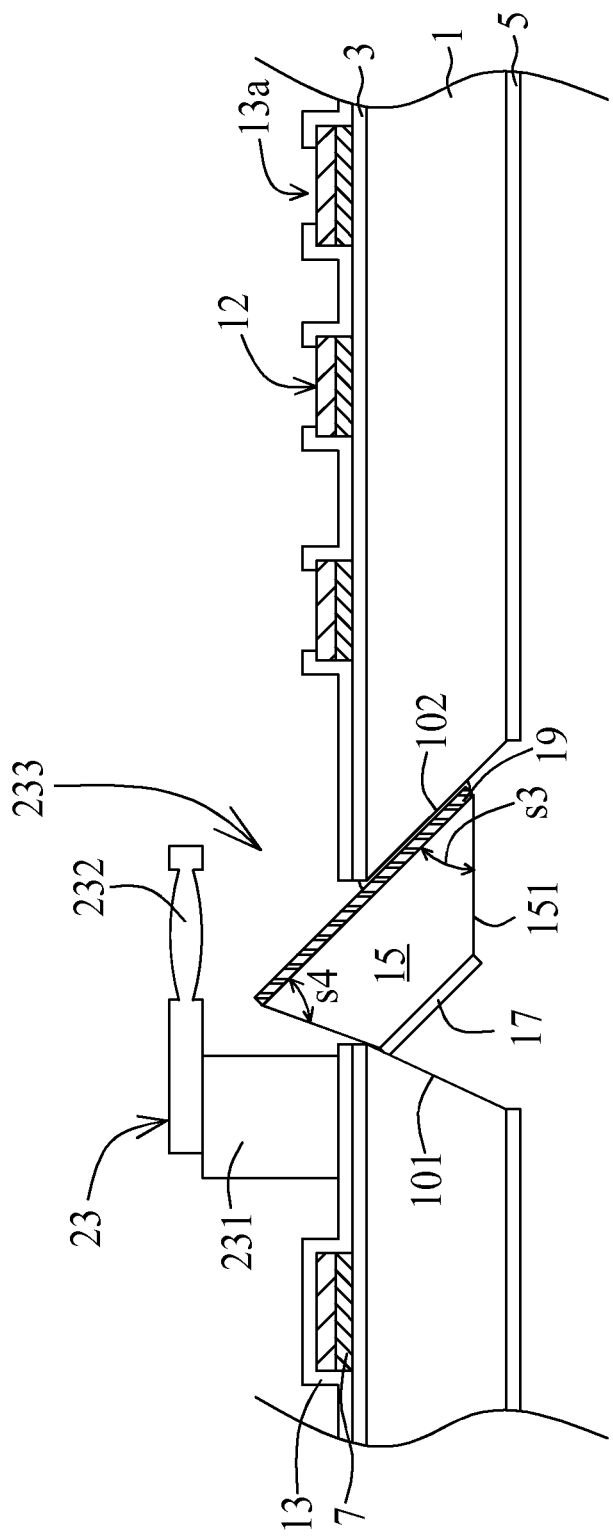

Referring to FIG. 3d, a micro-lens module 23 is mounted on the substrate 1 and over the optical substrate 20. The micro-lens module 23 includes a supporting block 231 mounted on the substrate 1 and facing the sidewall 152 of the optical substrate 20 protruding from the hole 1a, and a micro-lens 232 mounted to the supporting block 231 and over the optically reflective layer 19 of the optical substrate 20 protruding from the hole 1a such that the micro-lens 232 may be on an optical path to the optically reflective layer 19 or the optically reflective layer 19 may be on an optical path to the micro-lens 232. The supporting block 231 may support the optical substrate 20 with a vertical gap 233 between the optically reflective layer 19 and the micro-lens 232. The micro-lens 232 may be made of a material, such as silicon, a monocrystalline material or glass, having high refraction to ensure imaging and focusing qualities.

Figure 3E:
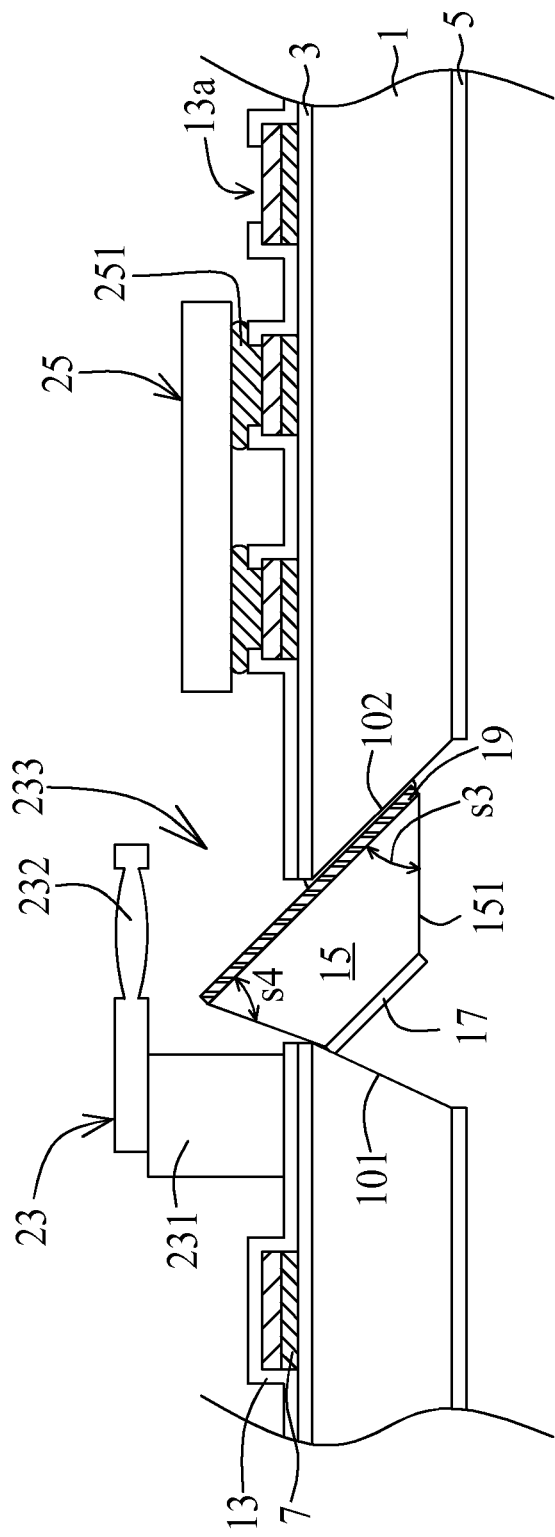

Referring to FIG. 3e, a light emitting device 25 is mounted on the substrate 15 and electrically connected to the patterned circuit layer 12 through the opening 13a. A eutectic bonding 251 may be employed to bond the light emitting device 25 to the patterned circuit layer 12 exposed by the opening 13a. The light emitting device 25 may be a laser diode (LD), photodiode (PD) or light-emitting diode (LED) configured to emit an optical signal to the optically reflective layer 19. Alternatively, the light emitting device 25 may be connected to the patterned circuit layer 12 using a wirebonding process.

Figure 3F:
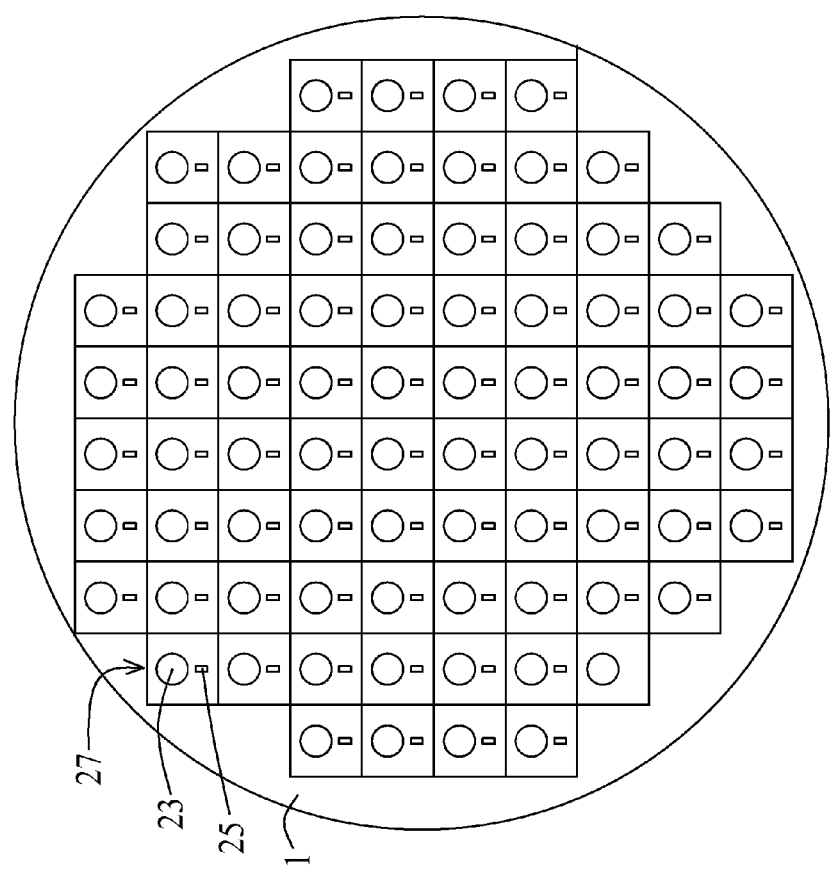
Figure 3G:
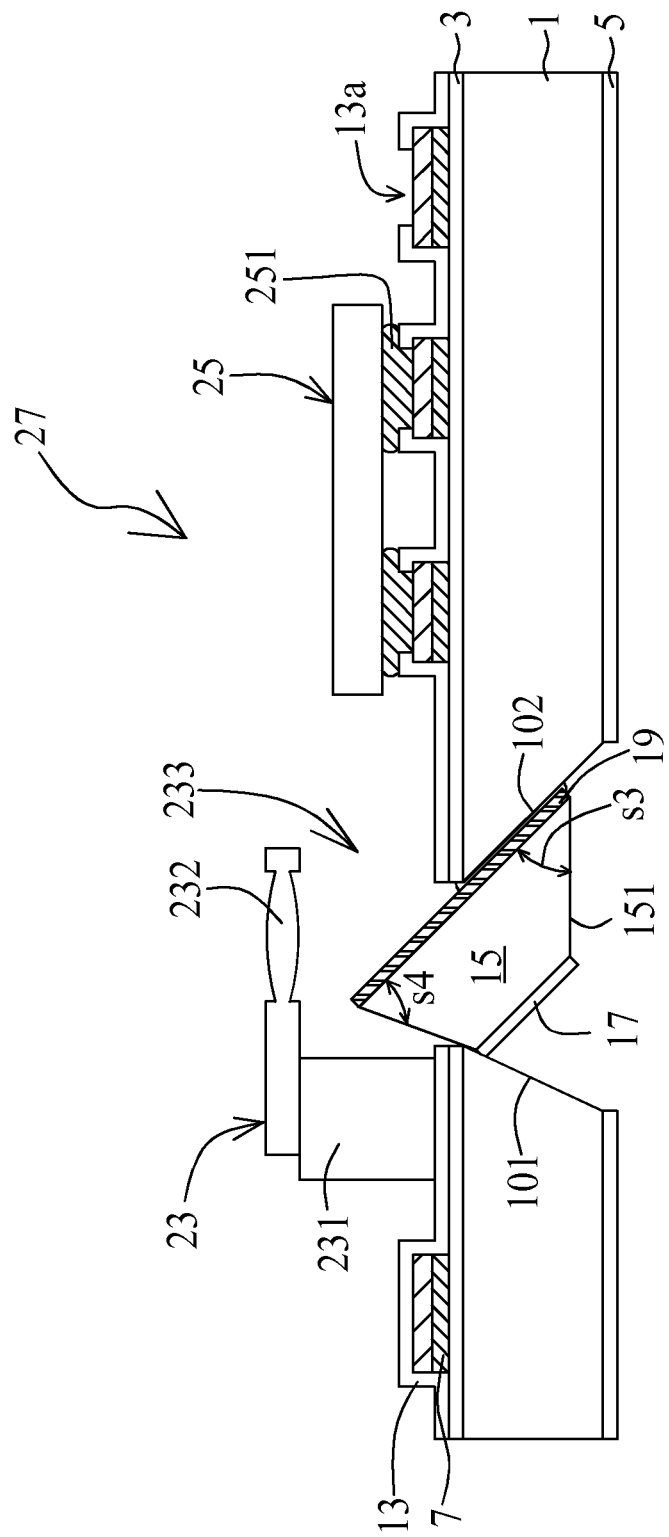
Figure 3H:
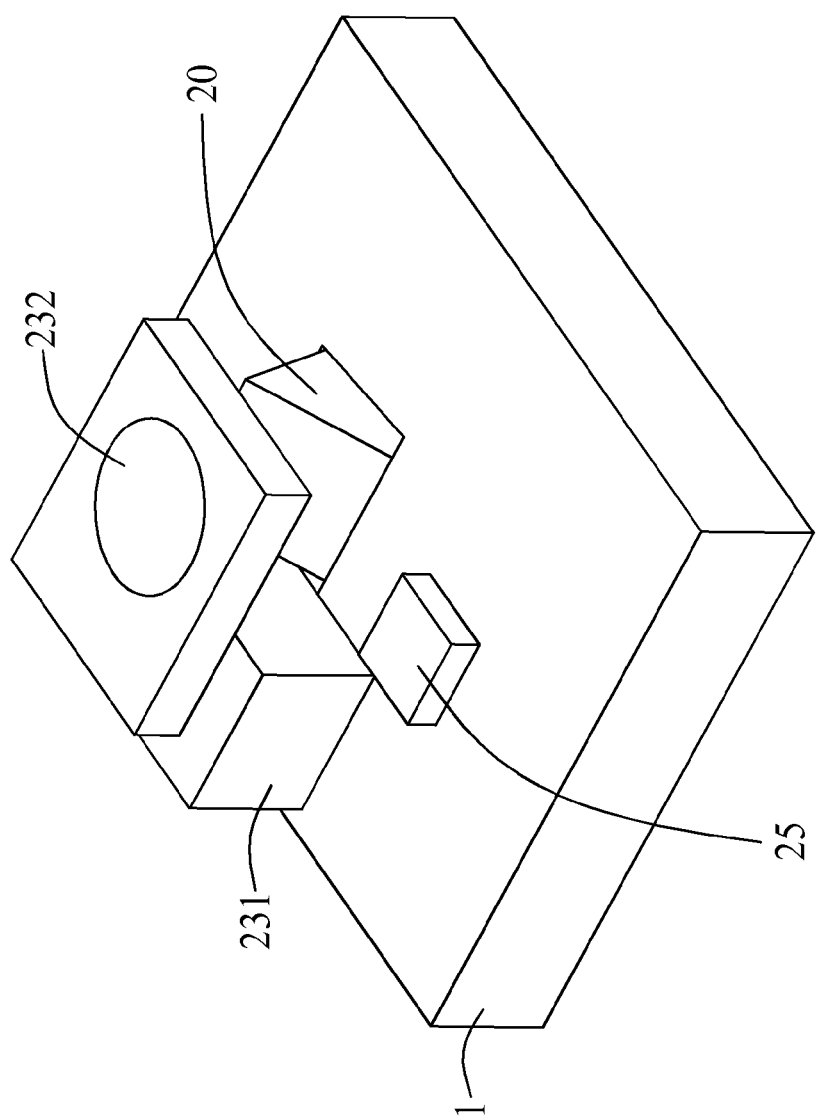

Referring to FIGS. 3f and 3h, the substrate may be cut 1 into multiple opto-electronic chips 27.

Figure 4A:
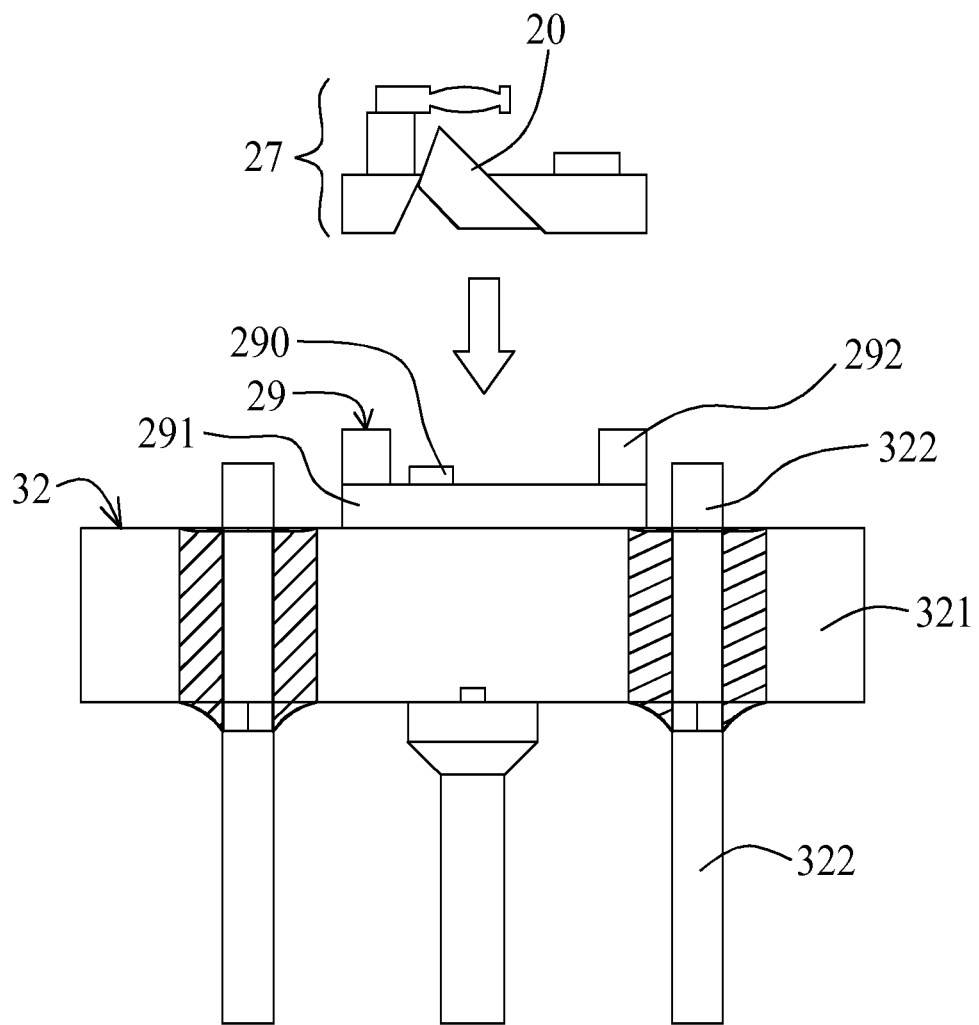
FIGS. 4a-4d are cross-sectional views illustrating a process for assembling an opto-electronic micro-module in accordance with the first embodiment of the present invention.
Figure 5:
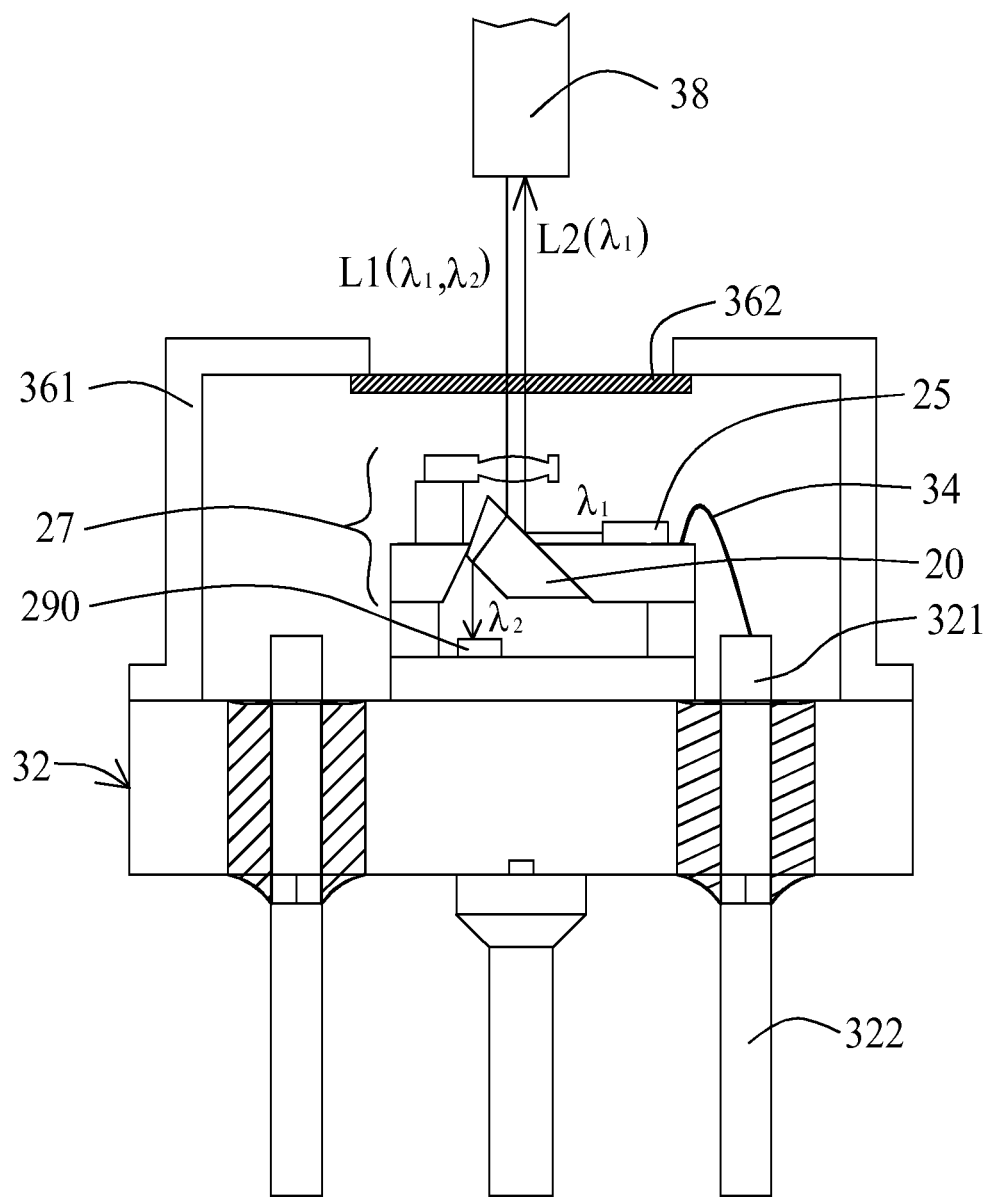
FIG. 5 is a cross-sectional view illustrating optical-signal transmission of an opto-electronic micro-module in accordance with the first embodiment of the present invention.

Referring to FIG. 4a, each of the opto-electronic chips 27 may be mounted onto a circuit board 32. The circuit board 32 includes a substrate 321 and multiple pins 322 passing through and electrically connecting with the substrate 321. A signal receiving module 321 mounted on the circuit board 32 includes an optical-signal receiver 290 configured to receive an optical signal from the optical substrate 20, a substrate 291 having the optical-signal receiver 290 mounted thereon and electrically connecting the optical-signal receiver 290 to the circuit board 32 and a supporting block 292 mounted on the substrate 291 for supporting the opto-electronic chip 27. The opto-electronic chip 27 has a bottom surface attached to a top surface of the supporting block 292 using an adhesive.

Figure 4B:
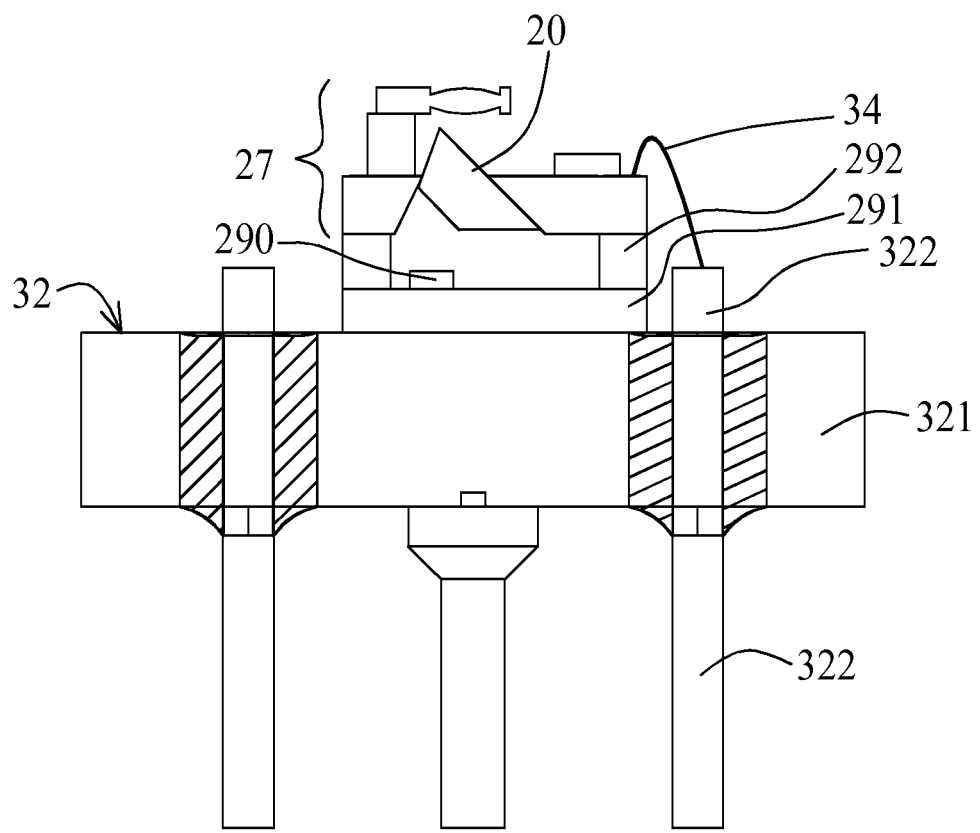

Referring to FIG. 4b, a wirebonded wire 34, such as gold wire or copper wire, may be formed by a wirebonding process to electrically connect the opto-electronic chip 27 to the substrate 321 or pins 322.

Figure 4C:
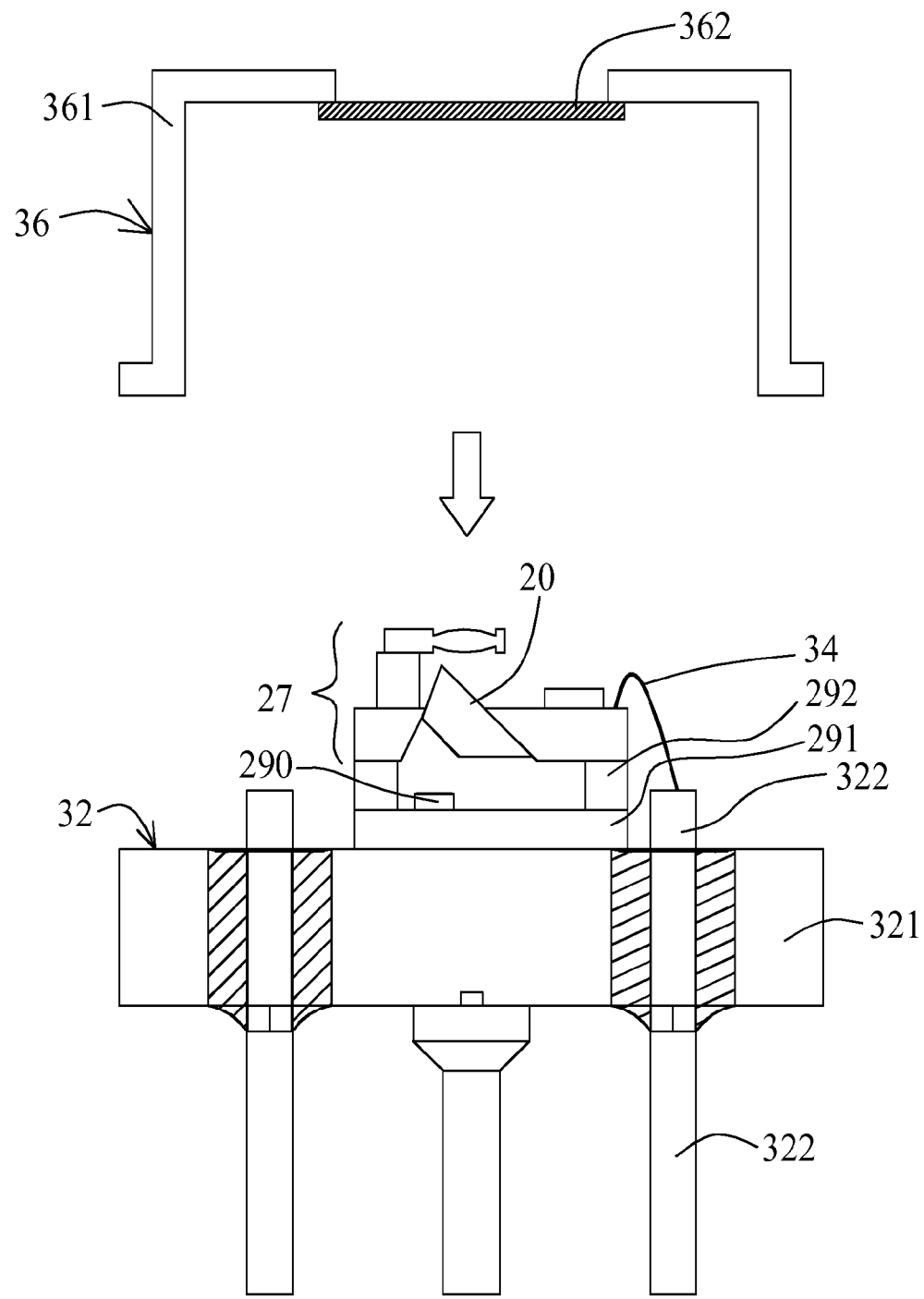
Figure 4D:
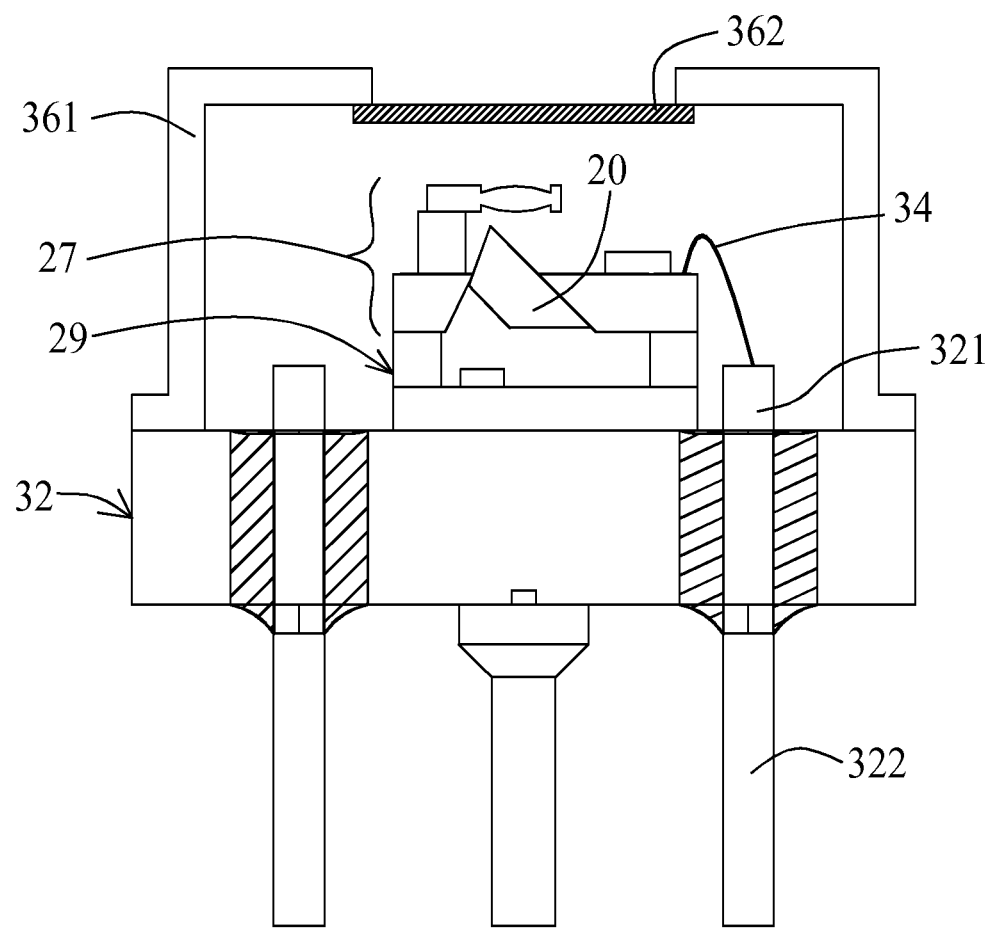

Referring to FIG. 4c, a shielding module 36 may be mounted on the circuit board 32 and over the opto-electronic chip 27 for shielding the opto-electronic chip 27 from being interfered by the environment. The shielding module 36 includes a housing 361 and a transparent sheet 362 fixed with the housing 361 and over the micro-lens module 23 such that the micro-lens 232 of the micro-lens module 23 may be on an optical path to the transparent sheet 362 or the transparent sheet 362 may be on an optical path to the micro-lens 232 of the micro-lens module 23. Thereby, the opto-electronic micro-module may be packaged.

Referring to FIG. 5, an optical fiber 38, such as single-mode fiber, multi-mode fiber or plastic fiber, may be arranged over the opto-electronic micro-module. Multiple downlink optical signals L1 transmitted from the optical fiber 38 may include a first optical signal having a wavelength $\lambda_1$, such as 1310 nm, and a second optical signal having a wavelength $\lambda_2$, such as 1550 nm. Alternatively, the first and second optical signals may have the same wavelength. The downlink optical signals L1 may pass through the transparent sheet 362 to be focused on the optically reflective layer 19 of the optical substrate 20, such as optical splitter, by the micro-lens 232. The optically reflective layer 19 may have the first optical signal to be reflected and may have the second optical signal to be refracted through the substrate 15 of optical substrate 20 to the optically anti-reflective layer 17. The optically anti-reflective layer 17 may refract the second optical signal to be received by the optical-signal receiver 290. The optical-signal receiver 290 may convert the second optical signal into a downlink electronic signal. Besides, upon receiving an uplink electronic signal, the light emitting device 25 may convert the uplink electronic signal into an optical signal L2 having the wavelength $\lambda_1$, such as 1310 nm, to be emitted from the light emitting device 25 to the optically reflective layer 19. The optically reflective layer 19 may totally reflect the optical signal L2 upwards to the micro-lens 232 at a substantially right angle. The optical signal L2 reflected from the optically reflective layer 19 may be focused by the micro-lens 232 and then passed by the transparent sheet 362 to the optical fiber 38.

Second Embodiment

Figure 6:
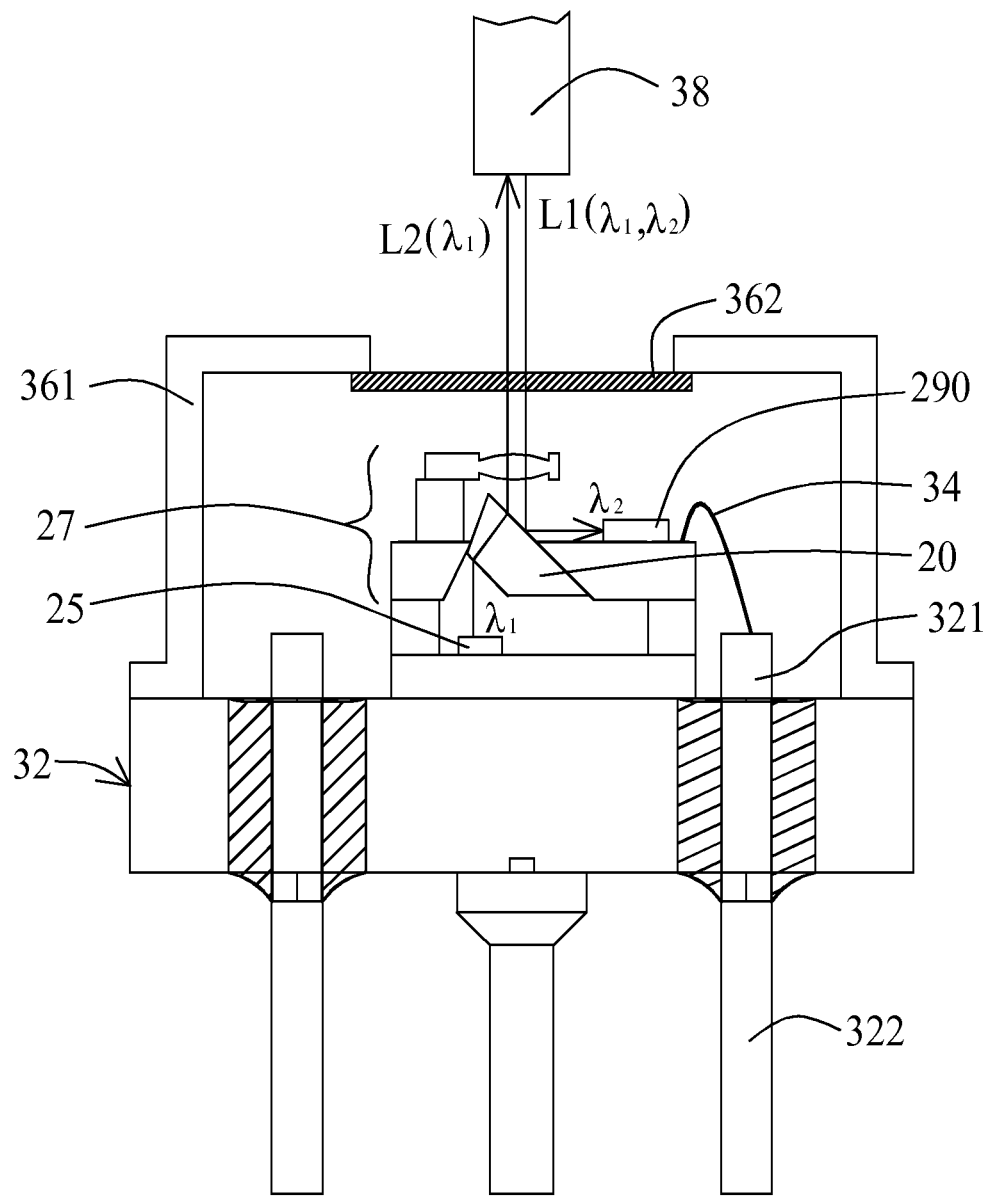
FIG. 6 is a cross-sectional view illustrating optical-signal transmission of an opto-electronic micro-module in accordance with a second embodiment of the present invention.

The second embodiment as illustrated in FIG. 6 is similar with the first embodiment. The difference between the first and second embodiments is that the positions of the optical-signal receiver 290 and the light emitting device 25 are replaced with each other and the optically reflective layers 19 of the optical substrates 20 in the first and second embodiments may have different rates of reflection and penetration. In this embodiment, multiple downlink optical signals L1 transmitted from the optical fiber 38 may include the first and second optical signals as illustrated in the first embodiment. The downlink optical signals L1 may pass through the transparent sheet 362 to be focused on the optically reflective layer 19 of the optical substrate 20, such as optical splitter, by the micro-lens 232. The optically reflective layer 19 may have the second optical signal to be reflected to the optical-signal receiver 290 and have the first optical signal to be refracted through the substrate 15 of the optical substrate 20. The optical-signal receiver 290 may convert the second optical signal into a downlink electronic signal. Besides, upon receiving an uplink electronic signal, the light emitting device 25 may convert the uplink electronic signal into the optical signal L2 having the wavelength $\lambda_1$ to be emitted from the light emitting device 25 to the optically anti-reflective layer 17. The optically anti-reflective layer 17 may refract the optical signal L2 through the substrate 15 of the optical substrate 20 to the optically reflective layer 19. The optically reflective layer 19 may refract the optical signal L2 upwards to the micro-lens 232. The optical signal L2 refracted from the optically reflective layer 19 may be focused by the micro-lens 232 and then passed by the transparent sheet 362 to the optical fiber 38.

Third Embodiment

Figure 7:
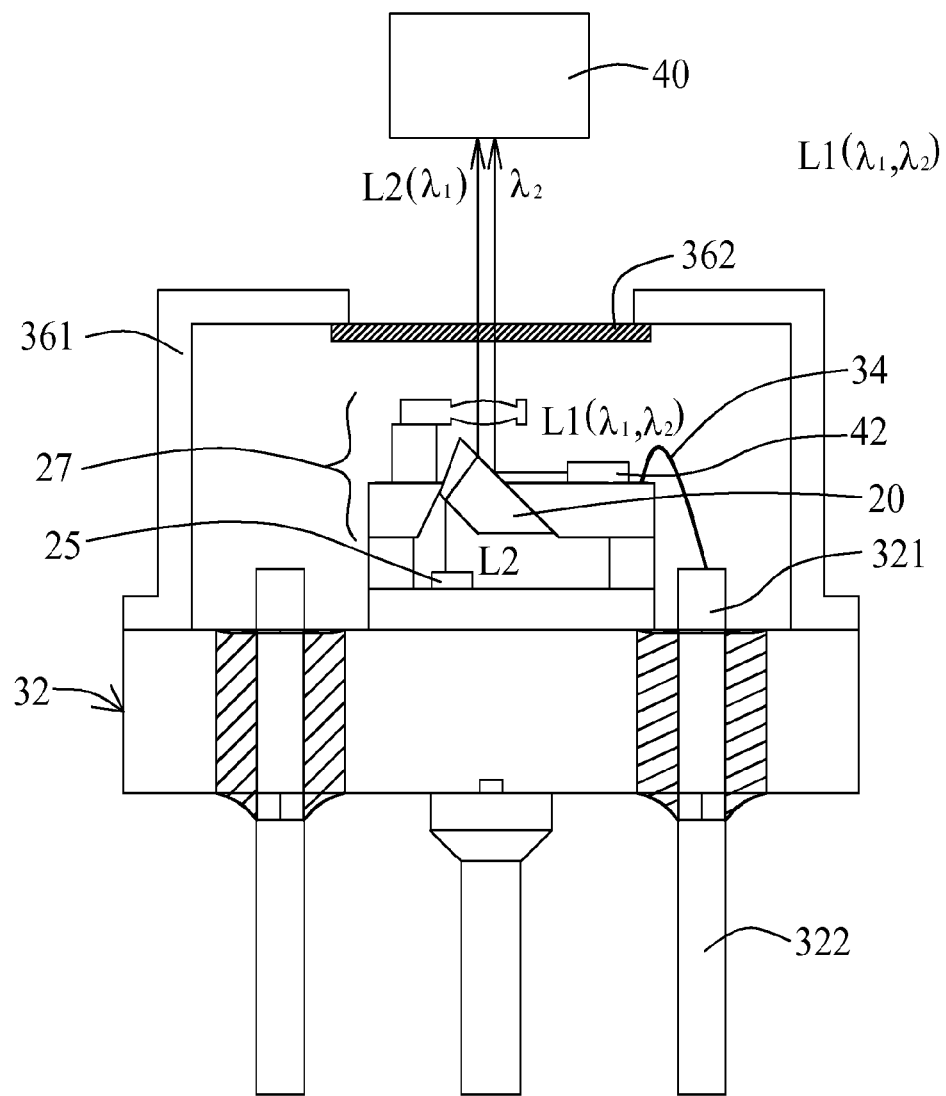
FIG. 7 is a cross-sectional view illustrating optical-signal transmission of an opto-electronic micro-module in accordance with a third embodiment of the present invention.

The third embodiment as illustrated in FIG. 7 is similar with the second embodiment. The difference between the second and third embodiments is that the optical-signal receiver 290 in the second embodiment is replaced with another light emitting device 42 as seen in the third embodiment and the optically reflective layers 19 of the optical substrates 20 in the second and third embodiments may have different rates of reflection and penetration. In this embodiment, an optical-signal receiver 40 is arranged over the opto-electronic micro-module, wherein the optical-signal receiver 40 may be an infrared sensor, ultraviolet sensor, color sensor, optical-fiber sensor, charge-coupled image sensor or complementary metal-oxide-semiconductor sensor. In this embodiment, upon receiving uplink electronic signals, the light emitting device 42 may convert the uplink electronic signals into the optical signals 1, including the first optical signal having the wavelength $\lambda_1$, such as 1310 nm, and the second optical signal having the wavelength $\lambda_2$, such as 1550 nm, to be emitted from the light emitting device 42 to the optically reflective layer 19. The optically reflective layer 19 may totally reflect the second optical signal upwards to the micro-lens 232 at a substantially right angle and refract the first optical signal through the substrate 15 of the optical substrate 20. The first optical signal reflected from the optically reflective layer 19 may be focused by the micro-lens 232 and then passed by the transparent sheet 362 to the optical-signal receiver 40.

Fourth Embodiment

Figure 8:
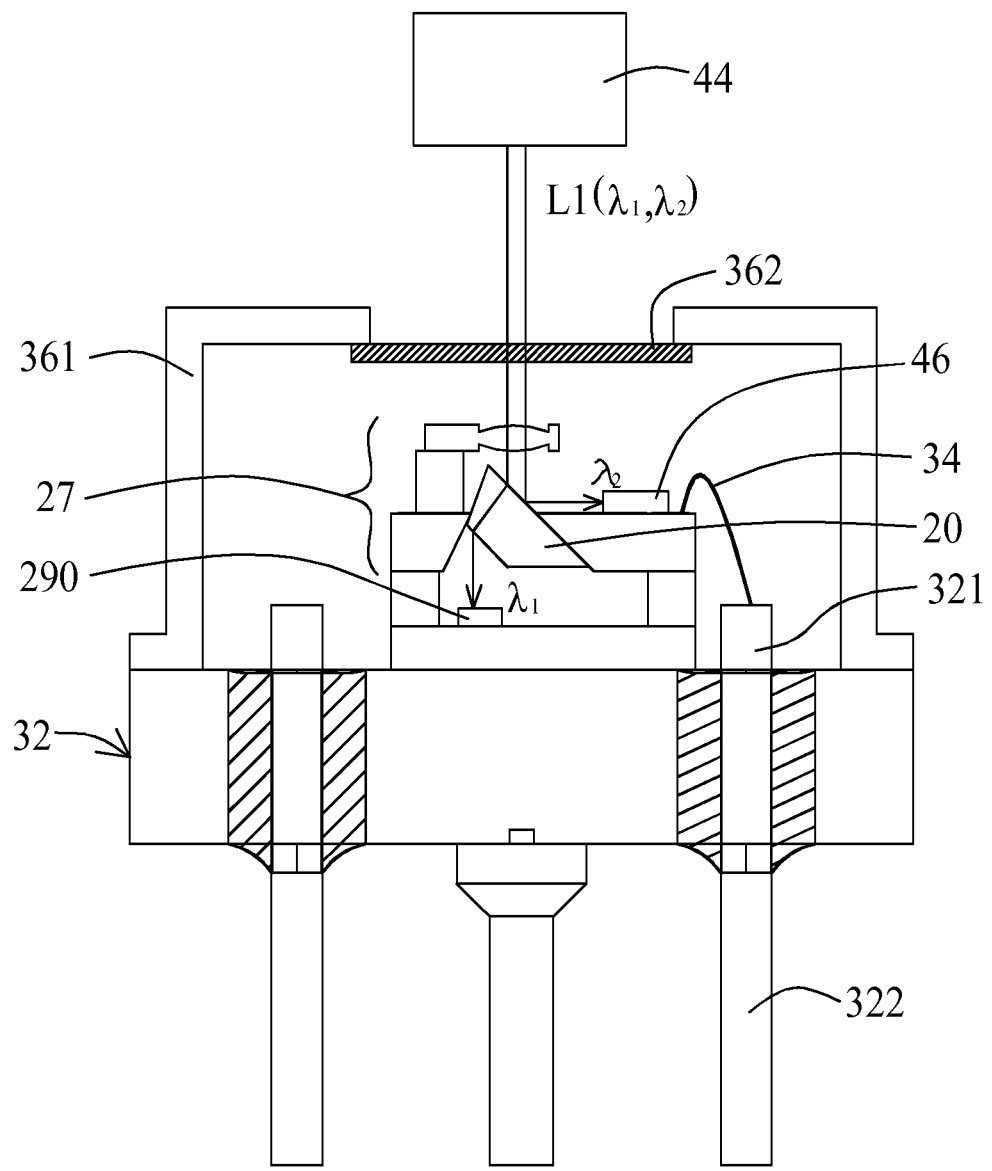
FIG. 8 is a cross-sectional view illustrating optical-signal transmission of an opto-electronic micro-module in accordance with a fourth embodiment of the present invention.

The fourth embodiment as illustrated in FIG. 8 is similar with the first embodiment. The difference between the first and fourth embodiments is that the light emitting device 25 in the first embodiment is replaced with another optical-signal receiver 46 as seen in the fourth embodiment and the optically reflective layers 19 of the optical substrates 20 in the first and fourth embodiments may have different rates of reflection and penetration. In this embodiment, a light source 44 configured to emit optical signals is arranged over the opto-electronic micro-module, wherein the light source 44 may be a light emitting device or ambient lights, such as sunlight or fluorescent lamp. The light source 44 may emit optical signals L1 including the first optical signal having the wavelength $\lambda_1$, such as 1310 nm, and the second optical signal having the wavelength $\lambda_2$, such as 1550 nm, to the optically reflective layer 19. The optically reflective layer 19 may have the second optical signal to be reflected to the optical-signal receiver 46 at a substantially right angle and may have the first optical signal to be refracted through the substrate 15 of optical substrate 20 to the optically anti-reflective layer 17. The optically anti-reflective layer 17 may refract the first optical signal downwards to be received by the optical-signal receiver 290. The optical-signal receiver 290 may convert the first optical signal into a downlink electronic signal. The optical-signal receiver 46 may convert the second optical signal into another downlink electronic signal.

Accordingly, the opto-electronic micro-module in accordance with the present invention may be formed using the semiconductor-wafer-level process as mentioned above, so its size may be dramatically shrunk and its cost of fabrication may be dramatically reduced. Besides, the opto-electronic micro-module in accordance with the present invention may have a relatively wide range of operation temperature, such as between −40 and 100 Celsius degrees, and improved stability of signal transmission. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. Furthermore, unless stated otherwise, the numerical ranges provided are intended to be inclusive of the stated lower and upper values. Moreover, unless stated otherwise, all material selections and numerical values are representative of preferred embodiments and other ranges and/or materials may be used.

The scope of protection is limited solely by the claims, and such scope is intended and should be interpreted to be as broad as is consistent with the ordinary meaning of the language that is used in the claims when interpreted in light of this specification and the prosecution history that follows, and to encompass all structural and functional equivalents thereof.

What is claimed is:

1. An opto-electronic micro-module comprising:
a planar substrate having a first surface and a second surface parallel to said first surface, wherein a through hole passes from said first surface through said planar substrate to said second surface; and
an optical substrate having a first portion in said through hole and a second portion protruding from said through hole, wherein said optical substrate has a first surface facing and contacting a first sidewall of said through hole, wherein said second portion has a corner between said first surface of said optical substrate and a second surface of said optical substrate and outside said through hole, wherein said second surface faces a second sidewall of said through hole.

2. The opto-electronic micro-module of claim 1, wherein said first sidewall is inclined to said first surface of said planar substrate.

3. The opto-electronic micro-module of claim 1, wherein an acute angle between said first sidewall of said through hole and said first surface of said planar substrate is substantially 45 degrees.

4. The opto-electronic micro-module of claim 1, wherein an acute angle between said first sidewall of said through hole and said first surface of said planar substrate is between 30 and 60 degrees.

5. The opto-electronic micro-module of claim 1, wherein said planar substrate comprises a silicon monocrystalline substrate.

6. The opto-electronic micro-module of claim 1, wherein said optical substrate comprises an optical splitter.

7. The opto-electronic micro-module of claim 1, wherein said optical substrate comprises a silicon monocrystalline substrate.

8. The opto-electronic micro-module of claim 1, wherein said optical substrate comprises an optically reflective layer at said first surface of said optical substrate projected from said through hole.

9. The opto-electronic micro-module of claim 1, wherein said optical substrate comprises an optical film at said first surface of said optical substrate projected from said through hole.

10. The opto-electronic micro-module of claim 1, wherein a first angle between said first surface of said optical substrate and a third surface of said optical substrate is substantially the same as a second angle between said sidewall of said through hole and said first surface of said planar substrate, wherein said third surface of said optical substrate is opposite to said second surface of said optical substrate, wherein said third surface of said optical substrate is substantially parallel to said first surface of said planar substrate.

11. The opto-electronic micro-module of claim 1 further comprising a light emitting device over said planar substrate, wherein said light emitting device is configured to emit an optical signal to said optical substrate.

12. The opto-electronic micro-module of claim 11, wherein said light emitting device comprises a laser diode.

13. The opto-electronic micro-module of claim 11 further comprising a patterned circuit layer over said planar substrate, wherein said patterned circuit layer is connected to said light emitting device.

14. The opto-electronic micro-module of claim 1 further comprising an optical-signal receiver over said planar substrate, wherein said optical-signal receiver is configured to receive an optical signal from said optical substrate.

15. The opto-electronic micro-module of claim 1, wherein said optical substrate is configured to have an optical signal having a first wavelength to pass therethrough and have an optical signal having a second wavelength to be reflected.

16. The opto-electronic micro-module of claim 1 further comprising an optical-signal receiver configured to receive an optical signal passing through said optical substrate.

17. The opto-electronic micro-module of claim 1 further comprising a first optical-signal receiver configured to receive a first optical signal passing through said optical substrate and a second optical-signal receiver configured to receive a second optical signal reflected from said optical substrate.

18. The opto-electronic micro-module of claim 1, wherein said optical substrate has a third surface opposite to and parallel to said first surface of said optical substrate, wherein said optical substrate has a reflective layer at said first surface of said optical substrate and an anti-reflective layer at said third surface of said optical substrate.

19. The opto-electronic micro-module of claim 1 configured to couple with an optical fiber, further comprising a micro-lens optically coupled between said optical fiber and said optical substrate.

20. The opto-electronic micro-module of claim 19 further comprising a supporting block over said planar substrate, wherein said supporting block supports said micro-lens with a gap between said micro-lens and said optical substrate.

* * * * *